US011483228B2

(12) United States Patent
Liu et al.

(10) Patent No.: US 11,483,228 B2
(45) Date of Patent: Oct. 25, 2022

(54) METHODS, SYSTEMS, AND COMPUTER READABLE MEDIA FOR NETWORK TESTING USING AN EMULATED DATA CENTER ENVIRONMENT

(71) Applicant: Keysight Technologies, Inc., Santa Rosa, CA (US)

(72) Inventors: Winston Wencheng Liu, Woodland Hills, CA (US); Matthew R. Bergeron, Sunol, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 4 days.

(21) Appl. No.: 17/162,620

(22) Filed: Jan. 29, 2021

(65) Prior Publication Data
US 2022/0247661 A1 Aug. 4, 2022

(51) Int. Cl.
*H04L 43/50* (2022.01)
*G06F 9/455* (2018.01)
(Continued)

(52) U.S. Cl.
CPC .............. *H04L 43/50* (2013.01); *G06F 9/455* (2013.01); *G06F 9/50* (2013.01); *G06F 9/541* (2013.01);
(Continued)

(58) Field of Classification Search
CPC .................................. G06F 11/34; H04L 49/70
See application file for complete search history.

(56) References Cited

U.S. PATENT DOCUMENTS 4,792,753 A 12/1988 Iwai
5,247,517 A 9/1993 Ross et al.
(Continued)

FOREIGN PATENT DOCUMENTS

CN 107104903 A 8/2017
EP 0895375 A2 2/1999
(Continued)

OTHER PUBLICATIONS

Notice of Allowance and Fee(s) Due for U.S. Appl. No. 17/217,920 (dated Mar. 4, 2022).
(Continued)

*Primary Examiner* — Barbara B Anyan

(57) ABSTRACT

One method occurs at a test controller of a network test system implemented using at least one processor. The method includes receiving test configuration information for configuring a testing scenario comprising an emulated data center environment implemented using multiple network emulation platforms that are interconnected, wherein the test configuration information includes switching fabric topology information for defining the emulated data center environment; configuring, using the test configuration information, the emulated data center environment including sending a set of configuration instructions to each of the network emulation platforms, wherein each set of configuration instructions include resource allocation instructions for allocating ASIC switch resources of a respective network emulation platform to one or more emulated switches; and configuring, using the test configuration information, a test session for testing a system under test (SUT) using the emulated data center environment and a network visibility infrastructure.

20 Claims, 6 Drawing Sheets

(51) Int. Cl.

| | | |
|---|---|---|
| *G06F 9/50* | (2006.01) | |
| *H04L 41/12* | (2022.01) | |
| *G06F 16/245* | (2019.01) | |
| *H04L 41/0803* | (2022.01) | |
| *H04L 47/70* | (2022.01) | |
| *G06F 9/54* | (2006.01) | |
| *G06F 11/34* | (2006.01) | |
| *H04L 49/00* | (2022.01) | |

(52) U.S. Cl.
CPC ............ *G06F 11/34* (2013.01); *G06F 16/245* (2019.01); *H04L 41/0803* (2013.01); *H04L 41/12* (2013.01); *H04L 47/827* (2013.01); *H04L 49/70* (2013.01)

(56) References Cited

U.S. PATENT DOCUMENTS

| | | |
|---|---|---|
| 5,343,463 A | 8/1994 | van Tetering et al. |
| 5,390,314 A | 2/1995 | Swanson |
| 5,477,531 A | 12/1995 | McKee et al. |
| 5,535,338 A | 7/1996 | Krause et al. |
| 5,568,471 A | 10/1996 | Hershey et al. |
| 5,571,963 A | 11/1996 | Balchin et al. |
| 5,583,792 A | 12/1996 | Li et al. |
| 5,590,285 A | 12/1996 | Krause et al. |
| 5,600,632 A | 2/1997 | Schulman |
| 5,657,438 A | 8/1997 | Wygodny et al. |
| 5,671,351 A | 9/1997 | Wild et al. |
| 5,751,963 A | 5/1998 | Umetsu |
| 5,761,486 A | 6/1998 | Watanabe et al. |
| 5,787,147 A | 7/1998 | Gundersen |
| 5,787,253 A | 7/1998 | McCreery et al. |
| 5,822,520 A | 10/1998 | Parker |
| 5,838,919 A | 11/1998 | Schwaller et al. |
| 5,850,386 A | 12/1998 | Anderson et al. |
| 5,850,388 A | 12/1998 | Anderson et al. |
| 5,854,889 A | 12/1998 | Liese et al. |
| 5,878,032 A | 3/1999 | Mirek et al. |
| 5,905,713 A | 5/1999 | Anderson et al. |
| 5,974,237 A | 10/1999 | Shurmer et al. |
| 5,974,457 A | 10/1999 | Waclawsky et al. |
| 5,978,940 A | 11/1999 | Newman et al. |
| 5,982,852 A | 11/1999 | Schwartz |
| 5,991,265 A | 11/1999 | Lincoln |
| 6,011,777 A | 1/2000 | Kunzinger |
| 6,031,528 A | 2/2000 | Langfahl, Jr. |
| 6,044,091 A | 3/2000 | Kim |
| 6,108,800 A | 8/2000 | Asawa |
| 6,122,670 A | 9/2000 | Bennett et al. |
| 6,148,277 A | 11/2000 | Asava et al. |
| 6,172,989 B1 | 1/2001 | Yanagihara et al. |
| 6,173,333 B1 | 1/2001 | Jolitz et al. |
| 6,189,031 B1 | 2/2001 | Badger et al. |
| 6,233,256 B1 | 5/2001 | Dieterich et al. |
| 6,252,891 B1 | 6/2001 | Perches |
| 6,279,124 B1 | 8/2001 | Brouwer et al. |
| 6,295,557 B1 | 9/2001 | Foss et al. |
| 6,314,531 B1 | 11/2001 | Kram |
| 6,317,788 B1 | 11/2001 | Richardson |
| 6,321,264 B1 | 11/2001 | Fletcher et al. |
| 6,345,302 B1 | 2/2002 | Bennett et al. |
| 6,363,056 B1 | 3/2002 | Beigi et al. |
| 6,414,939 B1 | 7/2002 | Yamato |
| 6,430,617 B1 | 8/2002 | Britt et al. |
| 6,446,121 B1 | 9/2002 | Shah et al. |
| 6,507,923 B1 | 1/2003 | Wall et al. |
| 6,526,259 B1 | 2/2003 | Ho |
| 6,529,475 B1 | 3/2003 | Wan et al. |
| 6,535,487 B1 | 3/2003 | Biswas et al. |
| 6,545,979 B1 | 4/2003 | Poulin |
| 6,549,517 B1 | 4/2003 | Aweya et al. |
| 6,601,020 B1 | 7/2003 | Myers |
| 6,621,805 B1 | 9/2003 | Kondylis et al. |
| 6,678,246 B1 | 1/2004 | Smyth |
| 6,691,167 B2 | 2/2004 | Procopio et al. |
| 6,717,917 B1 | 4/2004 | Weissberger et al. |
| 6,721,290 B1 | 4/2004 | Kondylis et al. |
| 6,785,238 B1 | 8/2004 | Kago |
| 6,826,259 B2 | 11/2004 | Hoffman |
| 6,845,352 B1 | 1/2005 | Wang |
| 6,917,595 B2 | 7/2005 | Chang et al. |
| 7,039,712 B2 | 5/2006 | Valavi et al. |
| 7,096,264 B2 | 8/2006 | Bonney et al. |
| 7,099,438 B2 | 8/2006 | Rancu et al. |
| 7,123,616 B2 | 10/2006 | Weissberger et al. |
| 7,139,268 B1 | 11/2006 | Bhagwat et al. |
| 7,143,159 B1 | 11/2006 | Grace et al. |
| 7,222,255 B1 | 5/2007 | Claessens et al. |
| 7,304,951 B2 | 12/2007 | Rhee |
| 7,327,686 B2 | 2/2008 | Standridge |
| 7,342,897 B1 | 3/2008 | Nader et al. |
| 7,366,174 B2 | 4/2008 | MacFaden et al. |
| 7,418,492 B1 | 8/2008 | Cohen et al. |
| 7,426,181 B1 | 9/2008 | Feroz et al. |
| 7,433,943 B1 | 10/2008 | Ford |
| 7,468,947 B2 | 12/2008 | Mannal et al. |
| 7,486,728 B2 | 2/2009 | Park |
| 7,507,948 B2 | 3/2009 | Park et al. |
| 7,525,473 B2 | 4/2009 | Chu et al. |
| 7,664,048 B1 | 2/2010 | Yung et al. |
| 7,783,463 B2 | 8/2010 | Herro |
| 7,801,030 B1 | 9/2010 | Aggarwal et al. |
| 7,840,664 B2 | 11/2010 | Dugatkin et al. |
| 7,873,056 B2 | 1/2011 | Higuchi et al. |
| 7,908,130 B2 | 3/2011 | Van Ginkel et al. |
| 7,979,225 B2 | 7/2011 | Muller et al. |
| 8,125,907 B2 | 2/2012 | Averi et al. |
| 8,274,891 B2 | 9/2012 | Averi et al. |
| 8,452,846 B2 | 5/2013 | Fredette et al. |
| 8,644,164 B2 | 2/2014 | Averi et al. |
| 8,718,070 B2 | 5/2014 | Koponen et al. |
| 8,761,187 B2 | 6/2014 | Barde |
| 8,775,547 B2 | 7/2014 | Fredette et al. |
| 8,898,333 B1 | 11/2014 | White et al. |
| 8,914,432 B2 | 12/2014 | Hannel et al. |
| 8,942,109 B2 | 1/2015 | Dorenbosch et al. |
| 8,949,830 B2 | 2/2015 | Kannan et al. |
| 8,959,185 B2 | 2/2015 | Nakil et al. |
| 9,042,245 B2 | 5/2015 | Tzannes et al. |
| 9,049,271 B1 | 6/2015 | Hobbs et al. |
| 9,065,770 B2 | 6/2015 | Chew et al. |
| 9,069,727 B2 | 6/2015 | Martin et al. |
| 9,100,338 B2 | 8/2015 | Averi et al. |
| 9,231,849 B2 | 1/2016 | Hyoudou et al. |
| 9,294,296 B2 | 3/2016 | Kirschnick et al. |
| 9,356,857 B1 | 5/2016 | Narayanan et al. |
| 9,392,061 B2 | 7/2016 | Fredette et al. |
| 9,503,382 B2 | 11/2016 | DeCusatis et al. |
| 9,544,233 B2 | 1/2017 | Ansari et al. |
| 9,614,689 B2 | 4/2017 | Cook et al. |
| 9,628,339 B1 | 4/2017 | Thai et al. |
| 9,819,551 B2 | 11/2017 | Forster et al. |
| 9,898,317 B2 | 2/2018 | Nakil et al. |
| 9,971,620 B2 | 5/2018 | Karnes |
| 10,015,072 B2 | 7/2018 | Cantwell et al. |
| 10,063,473 B2 | 8/2018 | Wenig |
| 10,341,237 B2 | 7/2019 | Averi et al. |
| 10,447,543 B2 | 10/2019 | Rovner et al. |
| 10,579,408 B2 | 3/2020 | Wang et al. |
| 10,623,296 B2 | 4/2020 | Haramaty et al. |
| 10,686,671 B1 | 6/2020 | Mozumdar et al. |
| 10,733,088 B1 | 8/2020 | Sommers |
| 10,742,533 B2 | 8/2020 | Yadav et al. |
| 10,785,117 B2 | 9/2020 | Lui et al. |
| 10,826,839 B2 | 11/2020 | Huang et al. |
| 10,868,730 B2 | 12/2020 | Mozumdar et al. |
| 10,880,019 B1 | 12/2020 | Mestre Adrover et al. |
| 10,880,197 B2 | 12/2020 | Naskar et al. |
| 10,924,380 B2 | 2/2021 | Rovner et al. |
| 11,082,304 B2 | 8/2021 | Parsons et al. |
| 11,108,677 B2 | 8/2021 | Lui et al. |
| 11,323,354 B1 | 5/2022 | Sommers |
| 11,388,081 B1 | 7/2022 | Sommers et al. |

(56) References Cited

U.S. PATENT DOCUMENTS

| | | |
|---|---|---|
| 11,405,302 B1 | 8/2022 | Liu et al. |
| 2001/0016867 A1 | 8/2001 | Hu et al. |
| 2002/0027885 A1 | 3/2002 | Ben-Ami |
| 2002/0056100 A1 | 5/2002 | Shimomura et al. |
| 2002/0085502 A1 | 7/2002 | Chheda et al. |
| 2002/0105911 A1 | 8/2002 | Pruthi et al. |
| 2002/0138226 A1 | 9/2002 | Doane |
| 2002/0162059 A1 | 10/2002 | McNeeley et al. |
| 2002/0172205 A1 | 11/2002 | Tagore-Brage et al. |
| 2002/0184527 A1 | 12/2002 | Chun et al. |
| 2003/0009544 A1 | 1/2003 | Wach |
| 2003/0043434 A1 | 3/2003 | Brachmann et al. |
| 2003/0061506 A1 | 3/2003 | Cooper et al. |
| 2003/0069952 A1 | 4/2003 | Tams et al. |
| 2003/0139919 A1 | 7/2003 | Sher et al. |
| 2003/0188003 A1 | 10/2003 | Sylvest et al. |
| 2003/0191590 A1 | 10/2003 | Narayan et al. |
| 2003/0231741 A1 | 12/2003 | Rancu et al. |
| 2004/0044761 A1 | 3/2004 | Phillipi et al. |
| 2004/0064469 A1 | 4/2004 | Takahashi et al. |
| 2004/0111502 A1 | 6/2004 | Oates |
| 2004/0111519 A1 | 6/2004 | Fu et al. |
| 2004/0117474 A1 | 6/2004 | Ginkel et al. |
| 2004/0190449 A1 | 9/2004 | Mannal et al. |
| 2004/0190606 A1 | 9/2004 | Deshpande |
| 2004/0236866 A1 | 11/2004 | Dugatkin et al. |
| 2005/0021715 A1 | 1/2005 | Dugatkin et al. |
| 2005/0102390 A1 | 5/2005 | Peterson et al. |
| 2006/0002305 A1 | 1/2006 | Ginzburg |
| 2006/0239271 A1 | 10/2006 | Khasnabish et al. |
| 2007/0133441 A1 | 6/2007 | Kang et al. |
| 2007/0165531 A1 | 7/2007 | Labrador et al. |
| 2007/0248077 A1 | 10/2007 | Mahle et al. |
| 2007/0286090 A1 | 12/2007 | Rusmisel et al. |
| 2007/0297332 A1 | 12/2007 | Broberg et al. |
| 2008/0069133 A1 | 3/2008 | Yong et al. |
| 2008/0186968 A1 | 8/2008 | Farinacci et al. |
| 2009/0147806 A1 | 6/2009 | Brueckheimer |
| 2009/0168720 A1 | 7/2009 | Vinayakray-Jani et al. |
| 2010/0008305 A1 | 1/2010 | Yeo et al. |
| 2010/0153055 A1 | 6/2010 | Mucha et al. |
| 2010/0299433 A1 | 11/2010 | De Boer et al. |
| 2011/0002240 A1 | 1/2011 | Harel et al. |
| 2011/0007631 A1 | 1/2011 | Raina et al. |
| 2012/0120801 A1 | 5/2012 | Ramakrishnan et al. |
| 2012/0314578 A1 | 12/2012 | Averi et al. |
| 2013/0013107 A1 | 1/2013 | Felique |
| 2013/0077701 A1 | 3/2013 | Tsien et al. |
| 2013/0339101 A1 | 12/2013 | Riley et al. |
| 2014/0006570 A1 | 1/2014 | Loos et al. |
| 2014/0047125 A1 | 2/2014 | Hyoudou et al. |
| 2014/0160961 A1 | 6/2014 | Dragulescu et al. |
| 2014/0298335 A1 | 10/2014 | Regev et al. |
| 2014/0321285 A1 | 10/2014 | Chew et al. |
| 2015/0071067 A1 | 3/2015 | Martin et al. |
| 2015/0317169 A1 | 11/2015 | Sinha et al. |
| 2015/0334030 A1 | 11/2015 | Vasseur et al. |
| 2015/0365288 A1 | 12/2015 | Van Der Merwe et al. |
| 2016/0006658 A1 | 1/2016 | Averi et al. |
| 2016/0072706 A1 | 3/2016 | Huang et al. |
| 2016/0179850 A1 | 6/2016 | Martin et al. |
| 2016/0182305 A1 | 6/2016 | Martin et al. |
| 2016/0182319 A1 | 6/2016 | Martin et al. |
| 2016/0182327 A1 | 6/2016 | Coleman, Jr. et al. |
| 2016/0197802 A1 | 7/2016 | Schultz et al. |
| 2016/0345341 A1 | 11/2016 | Oliver et al. |
| 2017/0026280 A1 | 1/2017 | Yu et al. |
| 2017/0055133 A1 | 2/2017 | Dieselberg et al. |
| 2017/0094298 A1 | 3/2017 | Gu |
| 2017/0126588 A1 | 5/2017 | Anand et al. |
| 2017/0207976 A1 | 7/2017 | Rovner et al. |
| 2017/0207996 A1 | 7/2017 | Lui et al. |
| 2017/0353531 A1* | 12/2017 | Conn ............... G06F 11/34 |
| 2019/0222481 A1 | 7/2019 | Hira |
| 2019/0349259 A1 | 11/2019 | Rovner et al. |
| 2019/0372881 A1 | 12/2019 | Hu et al. |
| 2020/0021512 A1 | 1/2020 | Naskar et al. |
| 2020/0028772 A1 | 1/2020 | Laslau |
| 2020/0112524 A1 | 4/2020 | Sindhu et al. |
| 2020/0133688 A1 | 4/2020 | Shinde et al. |
| 2020/0195519 A1 | 6/2020 | Di Martino |
| 2020/0280518 A1 | 9/2020 | Lee et al. |
| 2020/0296023 A1 | 9/2020 | Kumar et al. |
| 2020/0313999 A1 | 10/2020 | Lee et al. |
| 2020/0336383 A1 | 10/2020 | Lui et al. |
| 2020/0366588 A1 | 11/2020 | Bergeron |
| 2021/0014170 A1 | 1/2021 | Huang et al. |
| 2022/0116303 A1* | 4/2022 | Sommers ............... H04L 49/70 |
| 2022/0116304 A1 | 4/2022 | Sommers et al. |

FOREIGN PATENT DOCUMENTS

| | | |
|---|---|---|
| JP | 2000049863 | 2/2000 |
| JP | 2000278265 | 10/2000 |
| JP | 4620103 B2 | 1/2011 |
| WO | 02056541 A2 | 7/2002 |
| WO | 2021015802 A1 | 1/2021 |
| WO | WO/2021/061581 | 4/2021 |

OTHER PUBLICATIONS

Non-Final Office Action for U.S. Appl. No. 17/069,768 (dated Jan. 27, 2022).

Notice of Allowance and Fee(s) Due for U.S. Appl. No. 17/067,627 (dated Feb. 8, 2022).

Notice of Allowance and Fee(s) Due for U.S. Appl. No. 17/217,920 (dated Jan. 14, 2022).

"INE Network Emulator Appliance," Technical Specifications, pp. 1-2 (2018).

Advisory Action for U.S. Appl. No. 17/069,768 (dated Sep. 28, 2021).

Non-Final Office Action for U.S. Appl. No. 17/198,870 (dated Sep. 17, 2021).

Notice of Allowance and Fee(s) DueforU.S. Appl. No. 17/067,627 (dated Aug. 20, 2021).

Final Office Action for U.S. Appl. No. 17/069,768 (dated Jul. 9, 2021).

Non-Final Office Action for U.S. Appl. No. 17/069,768 (dated Feb. 4, 2021).

Commonly-Assigned, co-pending U.S. Appl. No. 17/067,627 for "Methods, Systems, and Computer Readable Media for Network Testing Using Switch Emulation," (Unpublished, filed Oct. 9, 2020).

Commonly-Assigned, co-pending U.S. Appl. No. 17/069,768 for "Methods, Systems and Computer Readable Media for Active Queue Management," (Unpublished, filed Oct. 13, 2020).

Notice of Allowance and Fee(s) Due for U.S. Appl. No. 17/198,870 (dated Mar. 24, 2022).

Spirent Communications, "Cloud Computing Testing," pp. 1-10 (Apr. 2010).

Byagowi, A., et al., "Bringing the F16 Network into the Lab," OCP Global Summit, pp. 1-16 (Jan. 29, 2021).

Zhang, C., et al., "MPVisor: A Modular Programmable Data Plane Hypervisor," SOSR, pp. 1-2 (Apr. 3-4, 2017).

Stevens, "TCP/IP Illustrated, vol. 1: The Protocols," pp. 1-3 (1994).

Nichols, "Improving Network Simulation with Feedback," IEEE, 14 pages (1998).

Li et al., "A Simulation Study of TCP Performance in ATM Networks with ABR and UBR Services," IEEE, pp. 1269-1276 (1996).

Non-Final Office Action for U.S. Appl. No. 10/317,312 (dated Jan. 30, 2006).

Kurose et al., "Computer Networking: A Top-Down Approach Featuring the Internet," pp. 167-172 (2001).

"UCB/LBNL/NINT Network Simulator—ns (version 2)," http://web.archive.org/web/20000819030658/http://www.isi.edu/nsnam/ns/, Information Sciences Institute, 4 pages (Aug. 2000).

Leon-Garcia et al., "Communication Networks Fundamentals Concepts and Key Architectures," pp. 57-63 and 575-577 (2000).

(56) References Cited

OTHER PUBLICATIONS

Fall et al., "Simulation-based Comparisons of Tahoe, Reno, and SACK TCP," 18 pages (Jan. 7, 1998).
Notice of Allowance and Fee(s) Due for U.S. Appl. No. 10/317,312 (dated Dec. 9, 2010).
Interview Summary for U.S. Appl. No. 10/317,312 (dated Aug. 25, 2010).
Non-Final Office Action for U.S. Appl. No. 10/317,312 (dated May 7, 2010).
Final Office Action for U.S. Appl. No. 10/317,312 (dated Mar. 26, 2009).
Non-Final Office Action for U.S. Appl. No. 10/317,312 (dated Aug. 29, 2008).
Non-Final Office Action for U.S. Appl. No. 10/317,312 (dated Mar. 17, 2008).
Final Office Action for U.S. Appl. No. 10/317,312 (dated Sep. 12, 2007).
"TCP/IP model," http://en.wikipedia.org/wiki/TCP/IP_model, 8 pages (Aug. 2007).
Non-Final Office Action for U.S. Appl. No. 10/317,312 (dated Mar. 22, 2007).
Final Office Action for U.S. Appl. No. 10/317,312 (dated Aug. 11, 2006).
Zhang et al., "HyperV: A High Performance Hypervisor for Virtualization of the Programmable Data Plane," 2017 26th International Conference on Computer Communication and Networks (ICCCN), pp. 1-9 (2017).
Cziva et al., "High-Performance Virtualized SDN Switches for Experimental Network Testbeds," SI:SC16—INDIS, pp. 1-14 (Nov. 8, 2016).
Khalidi, "SONiC: The networking switch software that powers the Microsoft Global Cloud," Blog(/en-us/blog/) Cloud Strategy, pp. 1-10 (Mar. 8, 2017).
Siron, "What is the Hyper-V Virtual Switch and How Does it Work?" Altaro, pp. 1-22 (Sep. 26, 2019).
Han et al., "Virtualization in Programmable Data Plane: A Survey and Open Challenges," IEEE Open Journal of the Communications Society, pp. 1-7 (2020).
"Networking/SAI," Open Compute, pp. 1-6 (Oct. 2020).
Zhou et al., "HyperTester: High-performance Network Testing Driven by Programmable Switches," In The 15th International Conference on emerging Networking Experiments and Technologies (CoNEXT '19), pp. 1-14 (Dec. 9-12, 2019).
"TekExpress USB 3.0 (USB-RMT) Automated Receiver Compliance and Margin Test Solutions," Tektronix, pp. 1-154 (2021).
"QSFP DD Loopback Modules," High Speed IO, Amphenol ICC, pp. 1-2 (2021).
Sultana et al., "Flightplan Dataplane Disaggregation and Placement for P4 Programs," 18th {USENIX} Symposium on Networked Systems Design and Implementation, pp. 1-22 (2021).
"Agilent E4219A ATM Network Impairment Emulator," Keysight, pp. 1-5 (2021).
"Spirent Network Emulator," Spirent Communications, pp. 1-11 (Apr. 2021).
"Ethernet Network Emulator," MGA2510 Product Brief, Aukua Systems, pp. 1-2 (2021).
"Chimera Network Impairment Emulator," Xena Networks, pp. 1-2 (2021).
Commonly-Assigned, co-pending U.S. Appl. No. 17/542,011 for "Methods, Systems, and Computer Readable Media for Providing Adaptive Background Test Traffic in a Test Environment." (Unpublished, filed Dec. 3, 2021).
Notice of Allowance and Fee(s) Due for U.S. Appl. No. 17/067,627 (dated Oct. 22, 2021).
Commonly-Assigned, co-pending U.S. Appl. No. 17/498,723 for "Methods, Systems, and Computer Readable Media for Recycling Background Traffic in a Test Environment," (Unpublished, filed Oct. 11, 2021).

"Network Emulator II—Ethernet 10GE, 1GE, and 100MbE Ethernet Impairment Emulation," Keysight Technologies, pp. 1-8 (Oct. 22, 2020).
Cao et al., "TurboNet: Faithfully Emulating Networks with Programmable Switches," IEEE, pp. 1-11 (2020).
"Datasheet—Albedo NetStorm," Albedo Telecom, pp. 1-2 (Dec. 23, 2015).
"Albedo Net.Storm," NETSTORM.en, pp. 1-4 (2014).
"The Value of Network Impairment Testing in Power Grids," Calnex SNE, pp. 1-2 (2006).
Tos et al., "Adaptive RTP Rate Control Method," 2011 35th IEEE Annual Computer Software and Applications Conference Workshops, pp. 1-6 (2011).
Mittal et al., "Dynamic Simulation Control with Queue Visualization," Summer Computer Simulation Conference, pp. 1-7 (Jun. 2005).
Notice of Allowance and Fee(s) Due for U.S. Appl. No. 16/916,053 (dated Apr. 30, 2021).
Notification Concerning Availability of the Publication of the International Application for International Patent Application Serial No. PCT/US2020/051882 (dated Apr. 1, 2021).
Non-Final Office Action for U.S. Appl. No. 16/916,053 (dated Mar. 18, 2021).
Commonly-assigned, co-pending U.S. Divisional Appl. No. 16/586,300 for "Methods, Systems, and Computer Readable Media for Providing a Multi-Tenant Software-Defined Wide Area Network (SD-WAN) Node," (Unpublished, filed Sep. 27, 2019).
Notice of Allowance and Fee(s) Due for U.S. Appl. No. 15/523,997 (dated Oct. 13, 2020).
Commonly-assigned, co-pending U.S. Divisional Appl. No. 17/035,602 for "An Adaptive Private Network with Dynamic Conduit Process," (Unpublished, filed Sep. 28, 2020).
Notice of allowance and Fee(s) Due for U.S. Appl. No. 14/481,335 (dated Aug. 5, 2020).
Commonly-assigned, co-pending U.S. Appl. No. 16/916,053 for "Methods and Apparatus for Configuring a Standby Wan Link in an Adaptive Private Network," (Unpublished, filed Jun. 29, 2020).
Non-Final Office Action for U.S. Appl. No. 16/523,997 (dated May 26, 2020).
Notice of Allowance and Fee(s) Due and Applicant-Initiated Interview Summary for U.S. Appl. No. 15/409,001 (dated May 15, 2020).
Applicant-Initiated Interview Summary for U.S. Appl. No. 14/481,335 (dated May 13, 2020).
Non-Final Office Action for U.S. Appl. No. 15/409,001 (dated Jan. 27, 2020).
Non-Final Office Action for U.S. Appl. No. 14/481,335 (dated Jan. 24, 2020).
Applicant-Initiated Interview Summary for U.S. Appl. No. 15/409,001 (dated Dec. 6, 2019).
Advisory Action for U.S. Appl. No. 15/409,001 (dated Dec. 6, 2019).
Advisory Action for U.S. Appl. No. 14/481,335 (dated Nov. 8, 2019).
Applicant-Initiated Interview Summary for U.S. Appl. No. 14/481,335 (dated Oct. 23, 2019).
Final Office Action and Examiner-Initiated Interview Summary for U.S. Appl. No. 15/409,001 (dated Sep. 10, 2019).
Applicant-Initiated Interview Summary for U.S. Appl. No. 15/409,001 (dated Aug. 14, 2019).
Final Office Action for U.S. Appl. No. 14/481,335 (dated Aug. 8, 2019).
Commonly-assigned, co-pending U.S. Appl. No. 16/523,997 for "Adaptive Private Network (APN) Bandwidth Enhancements," (Unpublished, filed Jul. 26, 2016).
Notice of Allowance and Fee(s) Due and Examiner-Initiated Interview Summary for U.S. Appl. No. 15/409,019 (dated Jun. 4, 2019).
Non-Final Office Action for U.S. Appl. No. 15/409,001 (dated Apr. 4, 2019).
Non-Final Office Action for U.S. Appl. No. 14/481,335 (dated Apr. 1, 2019).
Applicant-Initiated Interview Summary for U.S. Appl. No. 14/481,335 (dated Mar. 22, 2019).

(56) References Cited

OTHER PUBLICATIONS

Applicant-Initiated Interview Summary for U.S. Appl. No. 15/409,019 (dated Mar. 15, 2019).
Notice of Allowance and Fee(s) Due for U.S. Appl. No. 15/647,924 (dated Feb. 19, 2019).
Applicant Initiated Interview Summary for U.S. Appl. No. 15/409,001 (dated Feb. 11, 2019).
Advisory Action for U.S. Appl. No. 15/409,001 (dated Feb. 4, 2019).
Non-Final Office Action for U.S. Appl. No. 15/409,019 (dated Dec. 6, 2019).
Final Office Action for U.S. Appl. No. 15/409,001 (dated Sep. 24, 2018).
Restriction and/or Election Requirement for U.S. Appl. No. 15/409,019 (dated Aug. 30, 2018).
Non-Final Office Action for U.S. Appl. No. 15/409,001 (dated Apr. 19, 2018).
Notice of Allowance and Fee(s) Due for U.S. Appl. No. 13/592,460 (dated Oct. 2, 2013).
Non-Final Office Action for U.S. Appl. No. 13/592,640 (dated May 24, 2013).

\* cited by examiner

400

| TOPOLOGY ID (TID) | DATA CENTER TOPOLOGY DESCRIPTION |
|---|---|
| TOP_1 | 1-NEP, 3-stage clos - [a,b,c] switches at each stage, x,y,z speeds and feeds (s&f) |
| TOP_2 | 2-NEPs, 3-stage clos - [a,b,c,d] switches at each stage, r speeds and feeds at NEP 1, stage 1 switches, s speeds and feeds at NEP 2, stage 1 switches, t speeds and feeds at NEP 1, stage 2 switch, u speeds and feeds at NEP 2, stage 2 switch, v speeds and feeds at NEP 1, stage 3 switch, w speeds and feeds at NEP 2, stage 3 switch |
| TOP_3 | 2-NEPs, 5-stage clos - [a,b,c] switches at each stage, w,x,y,z speeds and feeds for each stage respectively |
| TOP_4 | 3-NEPs, 3-stage clos - [a,b,c] switches at SPSW, [d,e] at TORSW, [f] at PODSW, x speeds and feeds at NEP 1 switches, y speeds and feeds at NEP 2 switches, z speeds and feeds at NEP 3 switches |

| TID | NEP ID | EMUL SW ID | LOGICAL PORT | PHYS SW ID | PHYS PORT |
|---|---|---|---|---|---|
| TOP_1 | NEP1 | TORSW1 | 1 | SW1 | 47 |
| TOP_1 | NEP1 | TORSW1 | 2 | SW1 | 14 |
| TOP_1 | NEP1 | TORSW1 | 3 | SW1 | 35 |
| TOP_1 | NEP2 | TORSW2 | 1 | SW2 | 22 |
| TOP_1 | NEP2 | TORSW2 | 5 | SW3 | 77 |
| TOP_1 | NEP2 | TORSW2 | 7 | SW2 | 62 |
| TOP_1 | NEP2 | TORSW2 | 9 | SW3 | 29 |
| ••• | ••• | ••• | ••• | ••• | ••• |
| TOP_4 | NEP2 | TORSW3 | 3 | SW2 | 26 |
| TOP_4 | NEP2 | TORSW3 | 4 | SW2 | 37 |
| TOP_4 | NEP2 | TORSW4 | 1 | SW3 | 18 |
| TOP_4 | NEP3 | TORSW4 | 3 | SW4 | 22 |
| TOP_4 | NEP3 | TORSW4 | 5 | SW5 | 23 |

FIG. 5

METHODS, SYSTEMS, AND COMPUTER READABLE MEDIA FOR NETWORK TESTING USING AN EMULATED DATA CENTER ENVIRONMENT

TECHNICAL FIELD

The subject matter described herein relates to network testing. More specifically, the subject matter relates to methods, systems, and computer readable media for network testing using an emulated data center environment.

BACKGROUND

Data center environments typically provide high reliability and security and typically include networked resources (e.g., virtual or physical servers connected via network switches) sharable by multiple clients of the data center operator. Large data centers are industrial scale operations using as much electricity as a small town. Various data centers may utilize virtualization. For example, a data center may implement multiple virtual machines (VMs) that communicate via a virtual switch (vSwitch), e.g., virtual servers, using a physical central processing unit (CPU)-based server or node in the data center. In this example, each VM may execute an operating system and other software, where each VM may appear as a physical server to end users.

It will be appreciated that an emulated switch of the type described in this disclosure is distinctly different from the entity referred to commonly in the industry as a virtual switch. More particularly, a virtual switch is a software application that runs on top of a CPU, which allows communication between virtual machines, where the virtual machines are administered by a virtual machine hypervisor. A vSwitch does not subdivide and allocate resources of an underlying physical switch ASIC chip into multiple emulated switches, but instead creates a software representation of a completely virtual switch (i.e., there is no mapping to underlying physical switch ASIC hardware).

When testing data center equipment, it is important to make sure that testing mimics real world scenarios and conditions. For example, when testing a data center server or related applications, it may be necessary to mimic or emulate resources in the data center.

Accordingly, a need exists for methods, systems, and computer readable media for network testing using an emulated data center environment.

SUMMARY

Methods, systems, and computer readable media for network testing using an emulated data center environment are disclosed. According to one method, the method occurs at a test controller of a network test system implemented using at least one processor. The method includes receiving test configuration information for configuring a testing scenario comprising an emulated data center environment implemented using multiple network emulation platforms that are interconnected, wherein the test configuration information includes switching fabric topology information for defining the emulated data center environment; configuring, using the test configuration information, the emulated data center environment including sending a set of configuration instructions to each of the network emulation platforms, wherein each set of configuration instructions include resource allocation instructions for allocating ASIC switch resources of a respective network emulation platform to one or more emulated switches; and configuring, using the test configuration information, a test session for testing a system under test (SUT) using the emulated data center environment and a network visibility infrastructure for obtaining performance information associated with the test session.

According to one system, the system includes a test controller of a network test system implemented using at least one processor. The test controller is configured for: receiving test configuration information for configuring a testing scenario comprising an emulated data center environment implemented using multiple network emulation platforms that are interconnected, wherein the test configuration information includes switching fabric topology information for defining the emulated data center environment; configuring, using the test configuration information, the emulated data center environment including sending a set of configuration instructions to each of the network emulation platforms, wherein each set of configuration instructions include resource allocation instructions for allocating ASIC switch resources of a respective network emulation platform to one or more emulated switches; and configuring, using the test configuration information, a test session for testing a SUT using the emulated data center environment and a network visibility infrastructure for obtaining performance information associated with the test session.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 4 is a diagram illustrating example data center topology configuration information;

FIG. 5 is a diagram illustrating example port mapping data for mapping emulated switch ports to physical switch ports.

DETAILED DESCRIPTION

Figure 1:
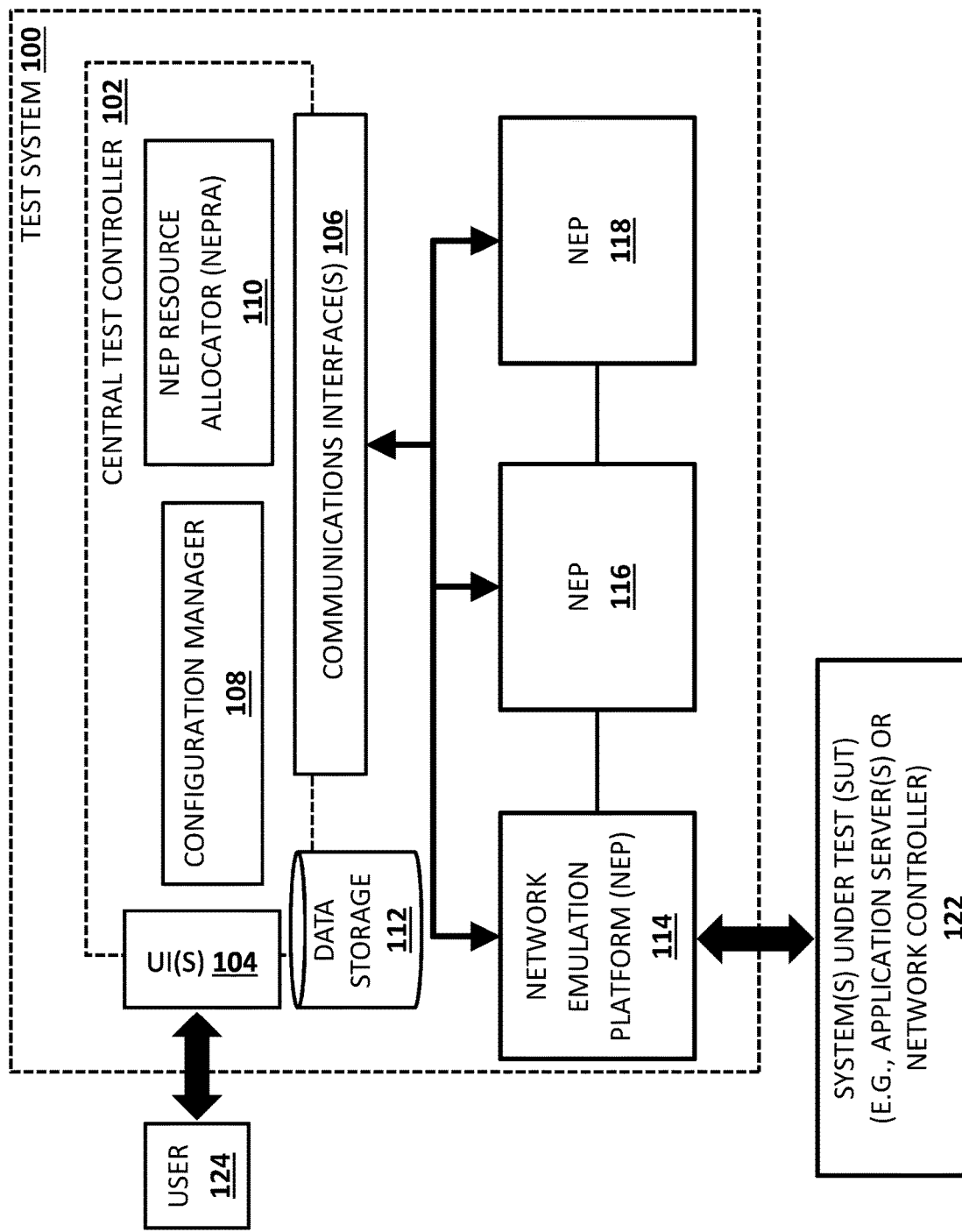
FIG. 1 is a diagram illustrating an example test system for network testing.

The subject matter described herein includes methods, systems, and computer readable media for network testing using an emulated data center environment. Such data center emulation can be useful for testing how a new network product or service performs at scale in a particular datacenter fabric and/or for testing how a new network product or service will impact the performance of a particular data center environment.

In accordance with some aspects of the subject matter described herein, a test system can provide an extensible physical and virtual framework for realistic emulation of data center fabrics (e.g., homogenous and heterogenous fabric) that can be used to test the performance of various devices, systems, and software (e.g., network interface card (NIC) hardware, server hardware, application software, etc.) in various real-world data center fabric environments. In some embodiments, the emulated data center environment itself is instrumented with an array of internal sensors that enable the test system to determine or predict the impact of a tested device or service at scale on the performance of a target data center fabric.

In accordance with some aspects of the subject matter described herein, a test system (e.g., one or more computing platforms, devices, or nodes) may be configured to emulate a data center environment, such as virtual networking resources and/or other data center related resources, by using multiple network emulation platforms (NEPs) (e.g., chassis or nodes with one or more physical switch ASIC resources usable for emulating a number of switches connected via various topologies). It will be appreciated that some embodiments include one or more emulated switches, where an emulated switch is a logically allocated portion of a physical switch ASIC of a network emulation platform that appears as an independent logical switch device to the environment (e.g., a DUT, SUT, or controller) by using a NEP resource allocator (NEPRA) and/or a switch ASIC resource allocator (SARA). In some embodiments, the NEPRA and/or SARA is adapted to facilitate collection and reporting of emulated logical switch performance metric information (e.g., emulated logical switch queue depth, emulated logical switch latency, etc.) during a test run or session by a visibility module.

In accordance with some aspects of the subject matter described herein, a test system may be configured to efficiently test network configurations by monitoring and/or analyzing various performance aspects of a SUT associated with an emulated data center environment. For example, an example test system described herein may be configured to emulate a data center environment comprising a multi-stage switching network comprising top-of-rack (TOR) switches, fabric or pod switches, and spine switches. In this example, the test system may utilize a central test controller that includes a NEPRA and/or a related orchestration layer for assigning multiple NEPs to emulate the data center environment. Using configuration information received via NEPRA or another test system entity, each NEP may utilize a SARA and/or a logical emulation layer to allocate physical switch ports and/or other physical resources to one or more emulated switches.

In accordance with some aspects of the subject matter described herein, emulating a data center environment using multiple NEPs (e.g., devices comprising at least one switch usable for emulating switching fabrics) may involve allocating (e.g., statically, semi-statically, or dynamically) to an emulated switch a subset of "front-panel" traffic ports of one or more NEPs for links to a SUT (e.g., servers or hosts that utilize switching fabric services) and for links connecting emulated switches. In some embodiments, external cables may not be required to realize link emulated switches because internal loopback interfaces and related switch pipeline configuration can obviate the need for external cabling within a NEP. In some embodiments, external cables may be used to connect emulated switches because the emulated switches may utilize resources from multiple or different NEPs.

In accordance with some aspects of the subject matter described herein, emulating a data center environment can allow a SUT (e.g., a network management system (NMS), a network operating system (NOS), a software-defined network (SDN) controller, or other entity) to access the emulated data center environment as if it consisted of multiple separate devices, each with their own resources such as traffic ports, buffers/queues, lookup tables, etc. In some embodiments, such emulation can eliminate or reduce the need for the SUT or a testing application to understand the details of the implementation and without requiring the SUT or the testing application to translate emulated switch information to resources of an underlying physical switch and without requiring the SUT or the testing application to monitor control-plane information of each emulated switch by using knowledge of an underlying physical switch's resources.

By utilizing NEPs, port mapping, and other emulation related information, an example test system can provide data center or switching fabric emulation using resources of one or more NEPs. For example, a test system may emulate a data center environment using multiple NEPs, where the emulated data center environment comprises multiple emulated switches, where at least some emulated switches may be heterogenous or have different characteristics (e.g., processing throughput and bandwidth speeds based on underlying physical resources or logical processing limits). Hence, a test system in accordance with the present disclosure can test a NOS, an NMS, and/or another entity or group of entities (e.g., application servers) that interact with the emulated data center environment or can predict the impact of a service or node on a real-world data center environment.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an example test system 100 for network testing. Test system 100 may represent any suitable entity or entities (e.g., one or more computing platforms, nodes, or devices) associated with testing SUT 122 (e.g., one or more application servers, a network controller, or a network management system). For example, test system 100 may include a central test controller (CTC) 102 for allowing a user 124 (e.g., a human operator or another entity) to configure or select a testing scenario (e.g., using predefined and/or user-defined templates), for generating and sending test traffic to SUT 122, for receiving response traffic from SUT 122, and/or for analyzing one or more test results and performance aspects associated with SUT 122.

In some embodiments, test system 100 may include test configuration software, one or more network equipment test devices or platforms, network emulation platforms (NEPs), visibility tools or modules (e.g., physical or virtual network taps), and/or test related software executing on one or more processor(s). In some embodiments, test system 100 may include one or more modules for performing various test related functions. For example, test system 100 may include a traffic (e.g., packet) generator for generating test traffic and/or testing related applications (e.g., a test analyzer or test configuration manager) for testing SUT 122.

In some embodiments, test system 100 or aspects thereof may be controlled or defined using one or more user-definable data models. For example, test system 100 may allow user 124 to configure or modify a resource allocator model, a switching model, a data center emulation or switching topology model, a traffic generator model, a network visibility model, etc. In this example, high-level or user-definable data models may be converted into lower-level data models or into computer readable instructions for implementing an emulated data center environment using the user-definable data models and resources in one or more of NEPs 114-118.

SUT 122 may be any suitable entity or entities (e.g., devices, systems, or platforms) for receiving, processing, forwarding, and/or sending one or more messages (e.g., packets). In some embodiments, SUT 122 may include one or more logical or physical partition. For example, SUT 122 may include a network node, a network switch, a network router, a network interface card, a packet forwarding device, or one or more virtual network functions (VNF). In this example, SUT 122 or a VNF thereof may be software in a virtual container (VC) or machine (VM) executing on shared resources (e.g., compute, storage, and network resources in a cloud computing environment). In some embodiments, nodes or a VNF of SUT 122 may include processing logic (e.g., rules associated with packet forwarding/processing) that is independent or separate from another portion of SUT 122 or another VNF.

Test system 100 may include a central test controller (CTC) 102 and multiple NEPs, e.g., NEPs 114-118. CTC 102 may be any suitable entity or entities (e.g., software executing on a processor, a field-programmable gateway array (FPGA), and/or an ASIC, or a combination of software, an FPGA, and/or an ASIC) for performing one or more aspects associated with configuring a test environment or a related testing scenario. In some embodiments, CTC 102 may be implemented using one or more processors and/or memory and may be a single device or node or may be distributed across multiple devices or nodes, e.g., cloud-based. For example, CTC 102 may act as a centralized, cloud-based entity for receiving user input related to setting up a testing scenario involving an emulated data center environment via one or more UI(s) 104 and may use the user input for configuring NEPs 114-118 or other test system entities for the testing scenario. In this example, CTC 102 may send sets of configuration instructions to various modules or entities, e.g., one or more NEPs 114-118 for setting up or configuring an emulated data center environment.

In some embodiments, CTC 102 may include a configuration manager (CM) 108. CM 108 may be any suitable entity or entities (e.g., software executing on a processor, a field-programmable gateway array (FPGA), and/or an ASIC, or a combination of software, an FPGA, and/or an ASIC) for performing one or more aspects associated with interfacing with user 124 and/or providing access to various test related services. In some embodiments, CM 108 may include an application programming interface (API) server or gateway and may be usable for providing one or more of UI(s) 104. For example, UI(s) 104 can be usable for provisioning test system 100, controlling test execution, and accessing or viewing test result information including emulated data center environment performance information. In this example, user 124 may communicate with an API server or other test system entity via an external API that is implemented using a remote procedure call (RPC) protocol, e.g., TOPO gRPC.

In some embodiments, CM 108 (or a related API server or gateway) may provide access to several test related services (e.g., traffic generation, visibility and fabric emulation, chassis resource, test case generation) with which the user can interact, provision, or control. For example, via one or more APIs or UI(s) 104 associated with CM 108, user 124 can provide test traffic generation requirements for a test session; provide or request test result performance metrics; provide data center or switching fabric emulation requirements or configurations; provide which of NEPs 114-118 or related resources are available for use in a test session; and/or provide test case definitions and associated configuration parameters.

In some embodiments, CTC 102 and/or CM 108 may include or utilize one or more UI(s) 104 for receiving settings and/or configuration information for setting up a testing scenario or a related test session. For example, UI(s) 104 may include any interface usable by one or more types of user 124 (e.g., a human or another entity like an application, a machine, or a device) to interact with test system 100 or related entities. In some embodiments, one or more of UI(s) 104 may support automation e.g., via one or more programming languages (e.g., python), a representation state transfer (REST) API, a remote procedure call API (e.g., gRPC API), a command line interface (CLI), a machine-to-machine (M2M) automation interface, and/or a web based GUI.

In some embodiments, UI(s) 104 may include or utilize a GUI or other user interface for selecting and/or configuring emulated data center environments and/or other related settings (e.g., test reporting and/or network visibility settings). For example, CTC 102 and/or CM 108 may provide a web based GUI for obtaining a test operator or another entity's intent for setting up or configuring testing scenarios and/or related emulated data center environments. In this example, the web based GUI may be usable for visually defining a data center switching topology comprising one or more emulated switches and/or to indicate particular physical resources to allocate to each emulated switch. In another example, the web based GUI may be usable for gathering test session settings and/or for providing cabling instructions for interconnecting NEPs 114-118 or other entities associated with a test session or test system 100.

In some embodiments, CM 108 may communicate or interact with a NEP resource allocator (NEPRA) 110. NEPRA 110 may be any suitable entity or entities (e.g., software executing on a processor, an FPGA, an ASIC, or a combination of software, an FPGA, and/or an ASIC) for performing one or more aspects associated with communicating with and/or controlling NEPs or related resources. For example, NEPRA 110 may include or utilize software (e.g., a distributed control and orchestration layer or related API) that provides an interface for communicating with NEPs 114-118 or other test system entities and may be effectively hidden from user 124.

In some embodiments, NEPRA 110 may allocate and manage resources of NEPs 114-118 for emulated switches without requiring a custom ASIC or hardware pipeline. In some embodiments, NEPRA 110 can be external or internal to CM 108.

In some embodiments, NEPRA 110 may include a resource allocator function configured for accessing user-specified switching fabrication emulation requirements or specification information and NEP resource information (e.g., user input and/or predefined knowledge) and to effectively translate the user's declared data center fabric emulation specification into a mapping of NEP resources and associated physical resource allocations, e.g., ASIC switch resources in one or more of NEPs 114-118).

For example, after user 124 specifies a target data center topology or environment to be emulated (e.g., based on a library of pre-defined data center fabric environments) and specifies that only NEPs 114 and 116 are available for use in emulating the target data center topology, NEPRA 110 (or a related resource allocator function) may access a NEP resource information database and generate a physical switch resource allocation map that is applied to the switches (e.g., ASICs, SoCs, etc.) contained in NEPs 114 and 116. In this example, the generated physical switch resource allocation map may effectively enable the switch resources in NEPs 114 and 116 to emulate the user-specified target data center topology.

Continuing with the above example, if user 124 subsequently selects NEP 118 to be added to the emulated data center environment, NEPRA 110 or a related entity (e.g., a resource allocator function) may generate a new or updated physical switch resource allocation map that is applied to the switches contained in NEPs 114-118, where the updated physical switch resource allocation map may effectively enables the switch resources in NEPs 114-118 to emulate the user-specified target data center topology.

In some embodiments, NEPRA 110 may include a logical to physical adaptor usable for converting and/or translating communications to refer to virtual or physical resources depending on the destination. For example, when requesting information about available switching resources via NEPRA 110, external applications, user 124, and/or SUT 122 may "see" a set of emulated switches each with a subset of resources instead of physical switches in one of NEPs 114-118. In this example, e.g., for NEP 114, logical to physical adaptor 212 may translate information about logical resources into information about physical resources of a switch (e.g., a Tomahawk 3 series switch) and vice versa so that interacting nodes may remain unaware of the underlying switch(es) 108 or related switch resources. Continuing with this example, e.g., for NEP 116, logical to physical adaptor 212 may translate information about logical resources into information about physical resources of a different type of switch (e.g., a Tomahawk 4 series switch) and vice versa so that interacting nodes may remain unaware of the underlying switch(es) 108 or related switch resources.

In some embodiments, NEPRA 110 may act as an orchestrator and reside between a device interface and interacting entities, e.g., SUT 122, testing applications 114, or external devices. In such embodiments, NEPRA 110 may act as a communications proxy or agent using a logical interface and an intermediate protocol or API. For example, after a test session is completed, NEPRA 110 may receive a user-specified request for requesting emulated switch performance metrics and, in response, may process or translate the request using a relevant generated physical switch resource map to query or poll the appropriate switch resources (e.g., in NEPs 114-118) in order to obtain and/or synthesize the relevant emulated switching fabric performance information. In this example, the emulated switching fabric performance information may be accessible to user 124 via one or more APIs or UI(s) 104.

In some embodiments, emulated switch performance data associated with various switching levels or stages and types of generated test traffic may be queried or polled (e.g., on-demand, at prescribed intervals, periodically during test execution, etc.) and stored by test system 100 or entities therein. In such embodiments, the emulated switch performance data may be accessible to user 124 via one or more APIs or UI(s) 104.

In some embodiments, test system 100 or related entities may be configured to monitor SUT performance during execution of a test session (e.g., via monitoring or link taps, polling of an OAM in SUT 122, etc.). For example, test system 100 may store and correlate SUT performance information with emulated switch performance data and/or generated test traffic levels and traffic types. In this example, the correlated test result information may be accessible to the user via the TOPO gRPC interface.

In some embodiments, test system 100 or entities thereof (e.g., CTC 102, testing applications 114, and/or NEPRA 110) may utilize communications interface(s) 106 for interacting with various test related entities. Communications interface(s) 106 may include or utilize any suitable entity or entities (e.g., one or more network interface cards (NICs), pluggable jacks, physical processors, transceiver modules, direct-attach cables (DACs) and/or other hardware) for sending or receiving communications. For example, communications interface(s) 106 (e.g., physical or virtual links) may allow CTC 102 or other entities (e.g., CM 108 or NEPRA 110) to send configuration information, settings, instructions, or other data to one or more of NEPs 114-118. In another example, communications interface(s) 106 (e.g., physical or virtual links) may allow CTC 102 or other entities to receive test results or feedback from NEPs 114-118 or SUT 122.

Each of NEPs 114-118 may include hardware and software usable for network emulation and/or switching fabric emulation. For example, each of NEPs 114-118 may be a distinct or separate chassis comprising an implementation of a particular switch processor (e.g., a switching ASIC, a system on a chip (SoC), custom hardware, an FPGA, a software switch, etc.), and dedicated data and control plane test traffic generation hardware resources (e.g., an FPGA, a CPU, a programmable data plane device like a P4 device, etc.). In some embodiments, NEPs 114-118 may be interconnected via various communication ports or links, e.g., 10 gigabit (10G) links, 25 gigabit (25G) links, 40 gigabit (40G) links, 100 gigabit (100G) links, etc.

In some embodiments, test system 100 or entities thereof (e.g., CTC 102, testing applications 114, and/or NEPRA 110) may include functionality for accessing data storage 112. Data storage 112 may be any suitable entity or entities (e.g., a storage device, a non-transitory computer readable medium, or a storage system) for maintaining or storing information related to data center emulation, network testing, or related test analysis. For example, data storage 112 may include data center emulation data (e.g., NEP resources to emulated switches, physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 112 may also include test traffic models, test cases, test session data, topology information for emulated data center environments and/or for SUT 122, and/or other information usable for generating performance metrics (e.g., statistics) associated with one or more aspects of SUT 122. In some embodiments, data storage 112 may be located at test system 100, another node, or distributed across multiple platforms or devices.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of CTC 102, CM 108, and NEPRA 110.

Figure 2:
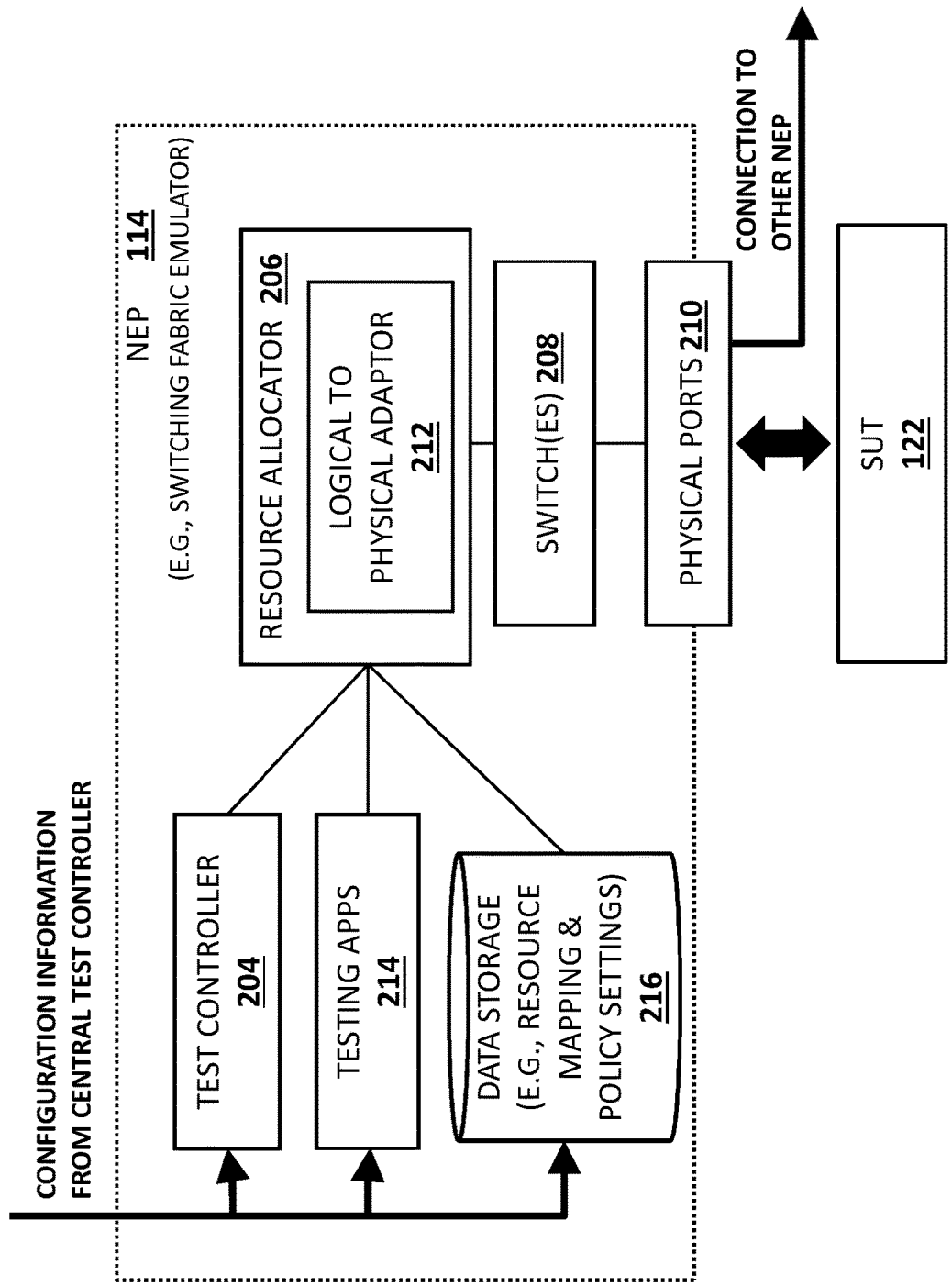
FIG. 2 is a diagram illustrating an example network emulation platform.

FIG. 2 is a diagram illustrating NEP 114. In some embodiments, NEP 114 may include a stand-alone tool, a testing device, a network equipment test device or platform, or software executing on one or more processor(s). In some embodiments, NEP 114 may be a single device or node (e.g., a chassis) and may include one or more modules for emulating a data center or a switching fabric environment and/or may include one or more modules for performing various test related functions associated with the emulated data center environment or a related switching fabric.

In some embodiments, NEP 114 may be configured to interact with and/or to be configured by CTC 102 or related entities (e.g., CM 108 and/or NEPRA 110). For example, NEP 114, along with other NEPs, may receive particular configuration information from CTC 102 or a related entity via an internal test API. In this example, the configuration information received by NEP 114 may include configuration instructions for configuring NEP 114 or resources therein for use in a testing scenario, e.g., involving one or more test sessions. In another example, the configuration information received by NEP 114 may include test related emulation requirements that are used by NEP 114 or entities therein in generating corresponding or compliant commands or instructions for configuring NEP 114 or resources therein.

NEP 114 may include a test controller (TC) 204, SARA 206, switch(es) 208, ports 210, testing applications 214, and data storage 216. TC 204 may be any suitable entity or entities (e.g., software executing on a processor, an FPGA, and/or an ASIC, or a combination of software, an FPGA, and/or an ASIC) for performing one or more aspects associated with configuring resources in NEP 114 and/or for testing SUT 122. In some embodiments, TC 204 may be implemented using one or more processors and/or memory. For example, TC 204 may utilize one or more processors (e.g., executing software stored in memory) to generate traffic patterns or scenarios for various message streams (e.g., flows or sessions). In another example, TC 204 may also utilize one or more processors to perform or initiate various tests and/or analyses involving test packets and/or related responses from SUT 122. In this example, TC 204 may send instructions to various modules or entities in NEP 114, e.g., testing applications 214 for controlling (e.g., to pause, (re)start, or stop) a test session.

In some embodiments, TC 204 may utilize out-of-band and/or in-band ports and/or interfaces for communicating with entities of NEP 114 or test system 100, e.g., CTC 102. For example, in embodiments where TC 204 is external to SARA 206, TC 204 may communicate with SARA 206 via a management port or related interface.

In some embodiments, TC 204 may interact with one or more testing applications 214. Testing applications 214 may represent software for testing SUT 122 and/or for performing various test related functions, including visibility (e.g., performance monitoring) and test analysis. In some embodiments, testing applications 214 can include, but are not limited to, visibility applications, SDN controller applications, GUI and CLI applications, and test traffic generation applications for communicating with SUT 122 and/or an emulated data center environment implemented using switch(es) 208.

In some embodiments, NEP 114 or aspects thereof may be controlled or defined using one or more user-definable data models. For example, CTC 102 may provide a GUI for allowing user 124 to configure or modify a SARA model, a switching model, a data center emulation or switching topology model, a traffic generator model, a network visibility model, etc. used in a testing scenario or a related emulated data center environment. In this example, CTC 102 may send, to TC 204, high-level or user-definable data models indicating a switching topology comprising one or more emulated switches and/or may indicate particular physical resources to allocate to each emulated switch. Continuing with this example, TC 204 or SARA 206 may convert these data models into lower-level data models or related computer readable instructions for implementing an emulated data center environment in accordance with the user-definable data models.

In some embodiments, testing applications 214 may include or utilize settings and/or configuration information from CTC 102 or another source (e.g., a GUI or CM 108) for setting up a testing scenario or a related test session. For example, received settings and/or configuration information may be usable for generating relevant test traffic (e.g., traffic flows). In another example, received settings and/or configuration information may be usable for instructing visibility infrastructure components for monitoring traffic and/or performance aspects associated with a testing scenario or a related emulated data center environment.

In some embodiments, testing applications 214 may include or utilize a traffic generator. For example, a traffic generator may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets. In this example, the traffic generator may be configured to utilize user input and predefined test case templates or related data to generate one or more test cases and/or test sessions.

In some embodiments, a traffic generator may generate test traffic that is directed to traverse emulated logical switches or an emulated data center environment or a related switching fabric. The emulated data center environment may be configured so as to emulate a particular switching fabric or topology. In some embodiments, a traffic generator may include one or more test traffic receivers (e.g., test receive ports) that are configured to receive the test traffic and generate test metric information, which may be accessible to a visibility module of test system 100.

In some embodiments, test traffic may transit the emulated data center environment or a related switch fabric without being received or transiting SUT 122. For example, user 124 may specify, via CM 108, levels and types of background traffic that can be generated on some or all of the NEPs associated with a particular testing scenario or session. For example, some or all of this test traffic can be configured to transit the emulated data center environment (but not SUT 122) during the execution of a test session involving SUT 122. In another example, some or all of this test traffic can be configured to transit SUT 122 during execution of a test session.

In some embodiments, testing applications 214 may include or utilize a visibility module and/or a related analyzer. In such embodiments, the visibility module and/or the related analyzer may be configurable by TC 204 for monitoring performance or telemetry information in a particular emulated data center environment or topology. For example, a visibility module may be any suitable entity or entities (e.g., software executing on a processor, an ASIC, an FPGA, or a combination of software, an ASIC, or an FPGA) for maintaining network visibility (e.g., using virtual or physical probes or network taps). In this example, virtual taps or software may be configured to provide switch metrics or other information (e.g., network telemetry, switch and/or link status information, etc.) associated with one or more elements (e.g., emulated switches) of an emulated data center environment. Continuing with this example, the visibility module may generate performance reports or test analysis reports associated with SUT 122, e.g., by utilizing the switch metrics or other information associated with packets that pass through or are generated by SUT 122.

In some embodiments, a visibility module may be configured for obtaining emulated logical switch performance metric information associated with a test session by polling SARA 206 or another test system entity. For example, by polling for logical switch performance metric information associated with a test session, user 124 may observe how the operation of SUT 122 impacts the emulated data center environment during a test. Polling logical switch performance metric information associated with a test session may also be used for observing how conditions (e.g., background traffic levels) in the emulated data center environment or a related switching fabric impact the DUT/SUT during a test.

In some embodiments, a visibility module is adapted to obtain or generate telemetry or operational performance data associated with the emulated switches during the execution of a test session involving SUT 122. In such embodiments, the visibility module may correlate the telemetry or operational performance data with SUT endpoint operational activities and events (e.g., SUT operational actions as defined in a test case) and may report performance data and/or correlated SUT endpoint information to user 124.

Switch(es) 208 may represent one or more switch processors (e.g., a switching ASIC, a system on a chip (SoC), custom hardware, an FPGA, a software switch, etc.) and may include additional hardware, firmware, and/or software for performing one or more functions associated with network switching. For example, switch(es) 208 may utilize an ASIC pipeline for performing frame or packet forwarding, e.g., sending a packet received from one port out another port of the switch. In some embodiments, various resources (e.g., lookup tables or match-action tables used for forwarding decisions, traffic manager buffer memory, traffic manager logical queues, etc.) of switch(es) 208 may be managed and/or allocated to provide emulated switches by SARA 206.

Ports 210 may include or utilize any suitable entity or entities (e.g., one or more network interface cards (NICs), pluggable jacks, physical processors, transceiver modules, direct-attach cables (DACs) and/or other hardware) for sending or receiving communications. For example, TC 204 or SARA 206 may configure one or more of ports 210 (e.g., physical connections) for receiving and sending various types of test packets or related data units; such as IP messages, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, ports 210 may include user traffic ports and management ports. For example, user traffic ports may be associated with processing, sending, and/or receiving test traffic, non-test traffic, and/or in-band management related communications and management ports may be associated with processing, sending, and/or receiving out-of-band management related communications.

In some embodiments, ports 210 may include multiple port modules or groups of ports for interacting with SUT 122. For example, depending on a test operator's configuration settings or a particular test session setup, SARA 206 may allocate a portion of physical resources to each switch that is emulated, where the emulated switches are collectively used to mimic a data center switching fabric. In some embodiments, each emulated switch may be allocated or associated with one or more of ports 210 and the port association may be static or semi-static (e.g., particular ports may be assigned to an emulated switch for a given test session).

SARA 206 may be any suitable entity or entities (e.g., software executing on a processor, an FPGA, an ASIC, or a combination of software, an FPGA, and/or an ASIC) for performing one or more aspects associated with allocating and managing emulated switches. In some embodiments, SARA 206 may allocate and manage resources of switch(es) 208 for providing emulated switches without requiring a custom ASIC pipeline. In some embodiments, SARA 206 can be external or internal to switch(es) 208.

In some embodiments, SARA 206 may utilize one or more management ports or related interfaces for communicating with a controller or related applications (e.g., CTC 102, TC 204 and/or testing applications 214) and/or for communicating with switch(es) 208. For example, TC 204 or a related application may communicate with SARA 206 via an out-of-band management port or related interface. In this example, SARA 206 may send instructions or other communications to switch(es) 208 via another management port or related interface.

In some embodiments, SARA 206 may include a logical to physical adaptor 212. Logical to physical adaptor 212 may be any suitable entity or entities (e.g., software executing on a processor, an FPGA, an ASIC, or a combination of software, an FPGA, and/or an ASIC) for converting and/or translating communications to refer to logical (e.g., virtual) or physical resources depending on the destination. For example, when requesting information about available switching resources via SARA 206, testing applications 214 and/or SUT 122 may "see" a set of emulated switches each with a subset of resources instead of switch(es) 208. In this example, logical to physical adaptor 212 may translate information about logical resources into information about physical resources of a single switch (e.g., Tomahawk 3) and vice versa so that interacting nodes may remain unaware of the underlying switch(es) 208 or related switch resources.

In some embodiments, SARA 206 and/or logical to physical adaptor 212 may reside between a native device interface and interacting entities (e.g., SUT 122, testing applications 214, or external devices) and may act as a communications proxy or agent using a logical interface. For example, SUT 122 may include a network switch controller that configures switching resources by sending, via a logical interface associated with SARA 206, configuration requests for requesting and/or configuring one or more switches. In this example, SARA 206 and/or logical to physical adaptor 212 may translate the configuration requests received via the logical interface into one or more corresponding requests for transmission via a native switch interface, where the corresponding requests include commands for configuring appropriate physical resources of underlying switch(es) 208. Further, SARA 206 and/or logical to physical adaptor 212 may translate switch performance results coming from a native switch interface into virtualized results (e.g., link status or counter values for a physical port '60' may be changed to values for a logical port 'v1' on an emulated switch TORSW1) before sending the virtualized results to the network switch controller via the logical interface.

In some embodiments, SARA 206 and/or logical to physical adaptor 212 may create, store, and/or use switch ASIC emulation data (e.g., physical to logical port mapping, physical buffers to virtual buffers mapping and resource allocation, etc.) and related policies (e.g., virtual and real port speed, virtual and real throughput, topologies, forwarding rules, classes of service, etc.) for sharing physical switch resources amongst the emulated switches. For example, by using port mapping data and policies stored in data storage 216, logical ports 'v1', 'v2', 'v3' on an emulated switch 'TORSW1' may be translated into physical ports '60', '61', '62', respectively. In this example, configuration commands for setting speed of port 'v1' can be translated so that the speed of corresponding physical port '60' is set. Continuing with this example, to query the statistical counters for logical port 'v1', the statistical counters for physical port '60' may be queried.

In some embodiments, SARA 206 and/or logical to physical adaptor 212 may utilize a modified proprietary (e.g., vendor) API (e.g., a vendor's software development kit (SDK) or by utilizing a wrapper API that interacts with a vendor API. For example, by using a wrapper API, SARA 206 can manage a fleet of emulated switches using off-the-shelf or commodity ASICs with NOSes that utilize a proprietary or vendor API.

In some embodiments, SARA 206 and/or logical to physical adaptor 212 may utilize a custom adaptor that handles certain applications or functions which may involve a subset of resource management and mapping requirements than a standard switching API. For example, by using a custom adaptor, SARA 206 can manage a fleet of emulated switches for certain use cases using off-the-shelf or commodity ASICs.

In some embodiments, NEP 114 or entities thereof (e.g., TC 204, testing applications 214, and/or SARA 206) may include functionality for accessing data storage 216. Data storage 216 may be any suitable entity or entities (e.g., a storage device, a non-transitory computer readable medium, or a storage system) for maintaining or storing information related to switch ASIC emulation, network testing, or related test analysis. For example, data storage 216 may include switch ASIC emulation data (e.g., physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 216 may also include test traffic models, test cases, test session data, topology information for emulated data center environments, information usable for generating performance metrics (e.g., statistics) associated with one or more aspects of SUT 122, and/or other information associated with testing SUT 122. In some embodiments, data storage 216 may be located at NEP 114, another node, or distributed across multiple platforms or devices.

It will be appreciated that FIG. 2 is for illustrative purposes and that various depicted entities, their locations, and/or their functions described above in relation to FIG. 2 may be changed, altered, added, or removed. For example, NEP 114 may include a chassis or rack including one or more computers (e.g., blade computers) each including at least one processor coupled to a memory, e.g., data storage 216. In this example, each server may include functionality of TC 204, SARA 206, and/or testing applications 214.

Figure 3:
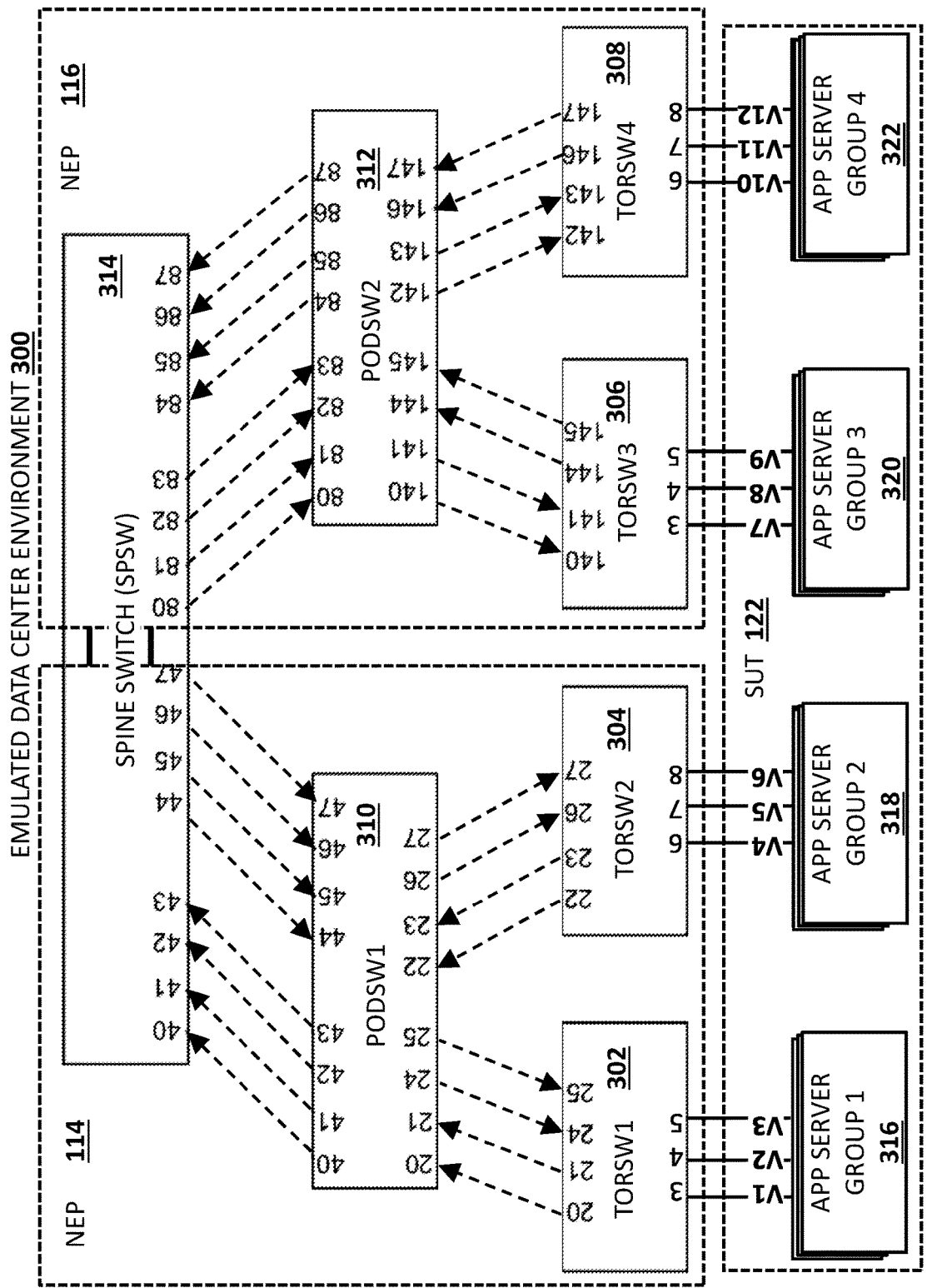
FIG. 3 is a diagram illustrating an example emulated data center environment usable for network testing.

FIG. 3 is a diagram illustrating an example emulated data center environment 300 usable for network testing. Emulated data center environment 300 may represent a switching fabric comprising a network of emulated switches for forwarding packets from or to SUT 122 or other entities, where the emulated switches may be connected via a particular (e.g., user-defined) logical topology. For example, emulated data center environment 300 may be implemented using resources (e.g., switches 108) of NEPs 114 and 116 and configured based on user input and/or predetermined environment templates or data models, e.g., stored in data storage 216.

In some embodiments (e.g., where emulated switching fabric environment 300 uses multiple NEPs), connections or links may be used for communicatively connecting NEPs or physical resources therein. For example, each of NEPs 114-118 may use one or more of its physical ports 210 for interconnecting or communicating with other NEPs., e.g., via 40G or 100G links. In another example, each of NEPs 114-118 may be communicatively connected via wireless transceivers.

Referring to FIG. 3, emulated data center environment 300 may represent a 3-stage Clos switching network comprising different stages of emulated switches, wherein each emulated switch is implemented using physical resources of NEP 114 and/or 116. As depicted, stage one switches of emulated data center environment 300 include top of rack switches (TORSWs) 302 and 304 implemented using NEP 114 and TORSWs 306 and 308 implemented using NEP 116. Stage two switches of emulated data center environment 300 include cluster or pod switch (PODSW) 310 implemented using NEP 114 and PODSW 312 implemented using NEP 116. Stage three of emulated data center environment 300 include a spine switch (SPSW) 314 implemented using both NEP 114 and 116. In some embodiments, TORSWs 302-308 may represent or emulate switches that are connected to multiple servers (e.g., located within a rack or nearby rack), PODSWs 310-312 may each represent or emulate an aggregation switch that is connected to multiple TORSWs, and SPSW 314 may represent or emulate a higher-level aggregation switch that is connected to multiple PODSWs.

In some embodiments (e.g., where emulated switching fabric environment 300 uses multiple NEPs), emulated switch communications between emulated switches may be transmitted between NEPs 114 and 116 via one or more inter-NEP links (e.g., physical 40G links or wireless links). In such embodiments, inter-NEP links and related transmissions may be treated differently for visibility purposes and/or may be treated differently by one or more emulated resources in emulated data center environment 300. For example, an inter-NEP link may be treated as a virtual internal link with a virtual port or interface by SPSW 314 since SPSW 314 is implemented using both NEPs 114 and 116.

In some embodiments, characteristics (e.g., bandwidth, supported protocols, or processing speed or throughput) of emulated switches may be varied as defined by test configuration information or related settings. For example, each of NEPs 114 and 116 may include a different brand, type, and/or version of switches 108 and/or other hardware. In this example, depending on user input and/or configuration information, NEPRA 110 may indicate which NEP is to emulate which emulated switches based on NEP capabilities and user requirements for emulated data center environment 300.

In some embodiments, some physical ports of switch(es) 208 of NEPs 114 and 116 may be associated with different emulated switches and may utilize loopback interfaces or internal interfaces for emulating communications between some emulated switches, while other emulated switches (e.g., TORSWs 302-308) may utilize physical interfaces and/or physical cabling for communicating with SUT 122 or portions thereof.

In some embodiments, SUT 122 may represent or include a set of application server groups 316-322, each representing one or more servers and/or applications. For example, application server group 1 316 may include multiple servers (e.g., 16 or more servers in a single rack), each having one or more connections to a TOR switch. In some examples, a server of application server groups 316-322 may include multiple applications or perform different services (e.g., machine learning (M/L), storage offload, search engines, webpages, video streaming, email, etc.) for users or may perform similar services for different sets of users. In some examples, a server of application server groups 316-322 may act as a client to another server.

In some embodiments, each of application server groups 316-322 may be connected (e.g., physically cabled) to a different set of physical ports 210 of switch(es) 208 in NEP 114 or NEP 116, where each set of physical ports 210 is assigned or allocated to a particular emulated switch. For example, SARA 206 of a respective NEP may assign physical ports '60', '61', and 62' to an emulated switch 'TORSW1' and may virtualize those physical ports as 'v1', 'v2', and 'v3', respectively. In this example, applications and/or servers in application server group 1 316 may be communicatively coupled to one or more of the logical ports of the emulated switch 'TORSW1'.

It will be appreciated that FIG. 3 is for illustrative purposes and that various depicted entities, their locations, and/or their functions described above in relation to FIG. 3 may be changed, altered, added, or removed.

FIG. 4 is a diagram illustrating example data center topology configuration information 400. In some embodiments, configuration information 400 or portions or variations thereof may be accessed and/or stored by CTC 102, NEPRA 110, CM 108 using one or more data structures or storage devices (e.g., data storage 112). In some embodiments, configuration information 400 or portions or variations thereof may be accessed and/or stored by TC 204 and/or SARA 206 of one or more of NEPs 114-118 using one or more data structures or storage devices (e.g., data storage 116).

In some embodiments, configuration information 400 may include any suitable information for mapping logical ports associated with emulated data center environment 300 to physical ports of switch(es) 208 in one of NEPs 114-118. In some embodiments, configuration information 400 may be stored or maintained in data storage 216 and may be usable for translating port information or related information in switch configuration commands, performance metrics, and/or other communications.

Referring to FIG. 4, configuration information 400 may be depicted using a table representing associations between a topology identifier (TID) and a corresponding topology description. In some embodiments, a TID may include any suitable identifier, such as one or more numbers or values, usable for identifying a switching topology or a related emulated data center environment. For example, each switching topology or emulated data center environment provided by user 124 or stored for testing may have a different, unique TID, e.g., 1, 2, 3, and 4, respectively.

In some embodiments, a topology description may include information for describing or defining a switching topology associated with an emulated data center environment, e.g., emulated data center environment 300. For example, a topology description may indicate the type of switching topology including the number of NEPs used for implementation, the number of switch stages, the types and number of emulated switches and ports at each stage, along with various characteristics (e.g., port speeds, link speeds, forwarding rules, throughput limits, etc.) that can be used to emulate or virtualize the data center environment described.

It will be appreciated that configuration information 400 in FIG. 4 is for illustrative purposes and that different and/or additional information may also be stored or maintained. Further, it will be appreciated that configuration information 400 may be stored in various data structures, memories, media, and/or in one or more locations.

FIG. 5 is a diagram illustrating example port mapping data 500 for mapping logical ports of emulated switches (e.g., TORSWs 302-308) to physical ports of switch(es) 208 in one of NEPs 114-118. In some embodiments, port mapping data 500 or portions or variations thereof may be accessed and/or stored by CTC 102, NEPRA 110, CM 108 using one or more data structures or storage devices (e.g., data storage 112). In some embodiments, port mapping data 500 or portions or variations thereof may be accessed and/or stored by TC 204 and/or SARA 206 of one or more of NEPs 114-118 using one or more data structures or storage devices (e.g., data storage 116).

In some embodiments, port mapping data 500 may include any suitable information for mapping logical ports associated with emulated data center environment 300 to physical ports of switch(es) 208 in one of NEPs 114-118. In some embodiments, port mapping data 500 may be stored or maintained in data storage 216 and may be usable for translating port information or related information in switch configuration commands, performance metrics, and/or other communications.

Referring to FIG. 5, port mapping data 500 may be depicted using a table representing associations between logical port information and physical port information. For example, each row or association may include a topology identifier (TID), an NEP ID, an emulated switch identifier (ESID), a logical port number, a physical switch identifier (PSID), and a physical port number.

In some embodiments, a TID may include any suitable identifier, such as one or more numbers or values, usable for identifying a switching topology or emulated data center environment 300. For example, a test operator may select a 3-stage Clos network environment with particular characteristics to emulate for a first test session, a 3-stage Clos network environment with different characteristics to emulate for a second test session, a 5-stage Clos network environment with particular characteristics to emulate for a third test session, and a 7-stage Clos network environment with particular characteristics to emulate for a fourth test session. In this example, each switching topology or emulated data center environment may have a different, unique TID, e.g., 1, 2, 3, and 4, respectively.

In some embodiments, a NEP ID may include any suitable identifier, such as one or more numbers or values, usable for identifying a NEP. For example, NEPs 114-118 may each have a unique name and/or number, e.g., 'NEP1, '345AR324T', 'N-1', etc. In some embodiments, NEP IDs may be unique within a test system or emulated data center environment 300. In some embodiments, NEP IDs may be unique amongst multiple (or even all) NEPs controlled by an operator or service provider.

In some embodiments, an ESID may include any suitable identifier, such as one or more numbers or values, usable for identifying an emulated switch. For example, emulated data center environment 300 may have seven emulated switches, each switch having a unique name and/or number, e.g., 'TORSW1', 'A', '234553242', etc. In some embodiments, ESIDs may be unique within a topology or emulated data center environment 300. In some embodiments, ESID may be unique amongst multiple (or even all) defined topologies or emulated data center environments.

In some embodiments, a logical port number may include any suitable identifier, such as one or more numbers or values, usable for identifying a port of an emulated switch. For example, an emulated switch 'PODSW1' of emulated data center environment 300 may have multiple logical ports, each having a unique name and/or number at least within that emulated switch, e.g., 'v1', 'v2', 'v3', etc. In some embodiments, logical port numbers may be unique within a topology or an emulated data center environment. In some embodiments, logical port numbers may be unique amongst multiple (or even all) defined topologies or emulated data center environments.

In some embodiments, a PSID may include any suitable identifier, such as one or more numbers or values, usable for identifying a physical switch, e.g., switch(es) 208. For example, NEPs 114-118 may each have one or two switches 208, each switch having a unique name and/or number, e.g., 'SW1', 'A', '234553242', etc. In some embodiments, PSIDs may be unique within a test system or a emulated data center environment. In some embodiments, PSIDs may be unique amongst multiple (or even all) NEPs controlled by an operator or service provider.

In some embodiments, a physical port number may include any suitable identifier, such as one or more numbers or values, usable for identifying a port of switch 208. For example, each switch 208 may have multiple physical traffic ports, each having a unique name and/or number at least within each physical switch, e.g., '60', '61', '62', etc. In some embodiments, physical port numbers may be unique within each of switches 208. In some embodiments, physical port numbers may be unique amongst multiple (or even all) switch(es) 208, e.g., used in emulated data center environment 300.

In some embodiments, (e.g., where multiple topologies are stored in a data structure), a TID, a NEP ID, an ESID, and a logical port number may be used as a combination lookup key or value for identifying a corresponding NEP, physical switch, and physical port. In some embodiments, e.g., where one topology is stored in a data structure, a NEP ID, an ESID, and a logical port number may be used as a combination key or value for identifying a corresponding NEP, physical switch, and physical port. In some embodiments, e.g., where each logical port number is unique in an emulated data center environment 300, a logical port number may be used as a lookup key or value for identifying a corresponding NEP, physical switch, and physical port.

It will be appreciated that port mapping data 500 in FIG. 5 is for illustrative purposes and that different and/or additional information may also be stored or maintained. Further, it will be appreciated that port mapping data 500 or related data may be stored in various data structures, memories, media, and/or in one or more locations.

Figure 6:
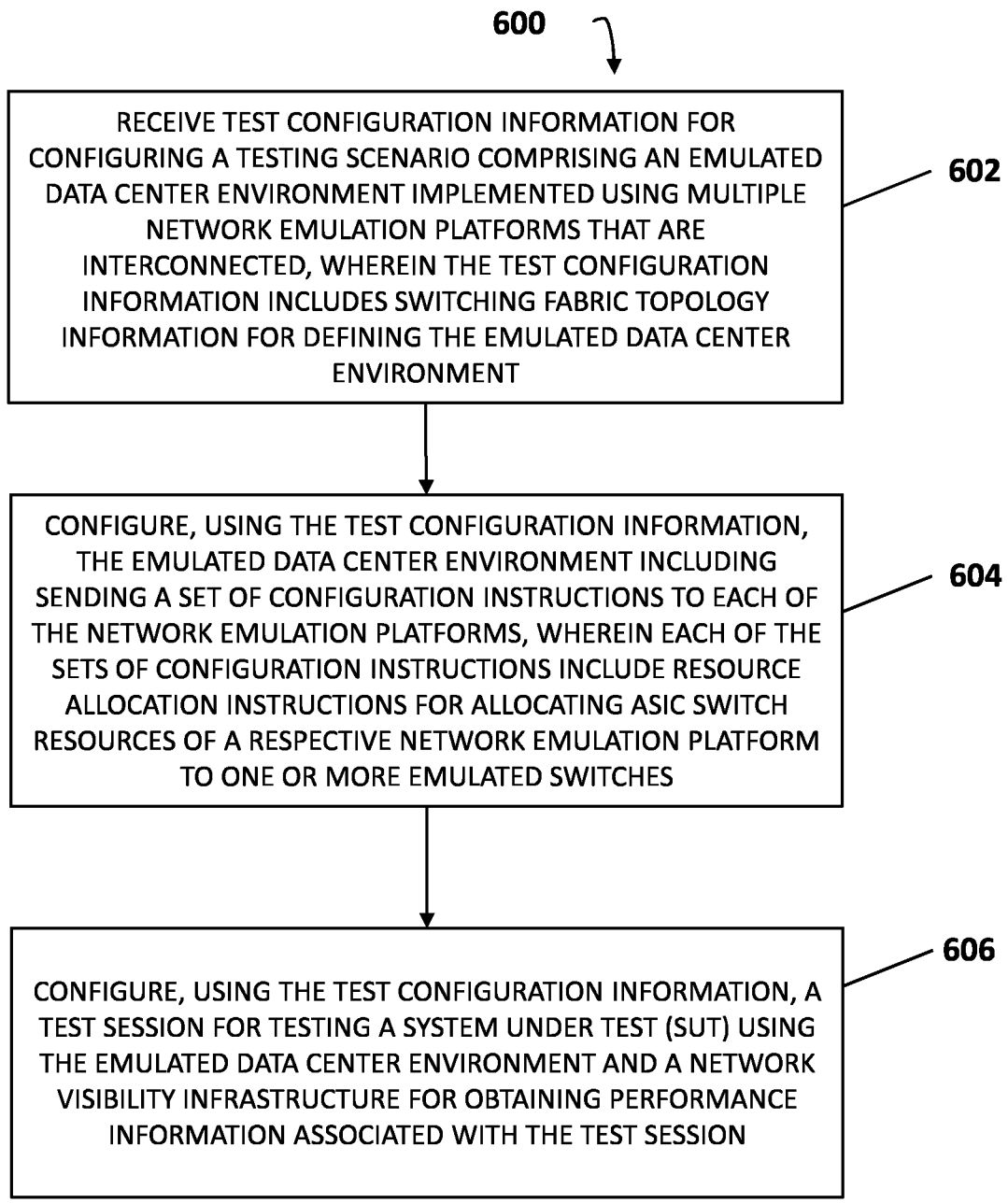
FIG. 6 is a diagram illustrating an example process for network testing using an emulated data center environment.

FIG. 6 is a diagram illustrating an example process 600 for network testing using an emulated data center environment. In some embodiments, process 600, or portions thereof, may be performed by or at CTC 102, CM 108, NEPRA 110, one or more of NEPs 114-118, TC 204, SARA 206, switch(es) 208, and/or another node or module (e.g., a network test controller). In some embodiments, process 600 may include steps 602-606.

Referring to process 600, in step 602, test configuration information may be received. The test configuration information may be for configuring a testing scenario comprising an emulated data center environment implemented using multiple NEPs that are interconnected, wherein the test configuration information includes switching fabric topology information for defining the emulated data center environment.

In some embodiments, receiving configuration information may include providing a user interface for defining an emulated data center environment involving the emulated switches.

In step 604, the emulated data center environment including sending a set of configuration instructions to each of the NEPs, wherein each of the sets of configuration instructions include resource allocation instructions for allocating ASIC switch resources of a respective NEP to one or more emulated switches may be configured using the configuration information.

In some embodiments, each set of configuration instructions may include instructions for configuring network visibility infrastructure components of a respective network emulation platform.

In step 606, a test session for testing a SUT using the emulated data center environment and a network visibility infrastructure for obtaining performance information associated with the test session may be configured using the configuration information.

In some embodiments, e.g., after configuring a testing scenario and a related test session, the test session may be initiated. For example, initiating the test session may include generating and sending, using at least one traffic generator in one or more of the utilized NEPs, test traffic via the emulated data center environment. In this example, the test traffic may include background test traffic that traverses or impacts the emulated data center environment but does not traverse SUT 122. In another example, test traffic may traverse the emulated data center environment on it way to or from SUT 122.

In some embodiments, e.g., during or after a test session, a performance query for accessing performance information about emulated data center environment 300 may be received from a requester (e.g., a test operator or a related system). In some embodiments, emulated data center environment 300 may be implemented using resources from multiple NEPs, e.g., NEPs 114-118.

In some embodiments, an emulated data center environment may include a first emulated switch for communications involving a first set of physical ports connecting a first portion of SUT 122 and the network test system and a second emulated switch for communications involving a second set of physical ports connecting a second portion of SUT 122 and the network test system. In some embodiments, a first emulated switch or a second emulated switch appear as a rack switch to SUT 122.

In some embodiments, SUT 122 may include a network node, a server, a NIC, an application server, or a group of servers.

In some embodiments, a performance query from a requester may be translated using physical to logical resource mapping information into at least two corresponding information requests, wherein one of the corresponding information requests refers to physical resources of a first network emulation platform associated with the emulated data center environment and another of the corresponding information requests refers to physical resources of a second network emulation platform associated with the emulated data center environment. In such embodiments, the at least two information requests may be sent to a respective NEP or a related controller.

In some embodiments, a response to an information request may be received from a NEP or a related controller and may contain switch performance information associated with the corresponding information request.

In some embodiments, switch performance information from a switch or a related controller may be translated using the physical to logical resource mapping information to the performance information about an emulated data center environment. In such embodiments, the performance information about the emulated data center environment may be provided to the requester. For example, a requester may a network controller, an NMS, an NOS, SUT 122, an SDN controller, a test operator, or another entity.

In some embodiments, prior to receiving the performance query, the network test system may configure and initiate a test session for testing SUT 122.

In some embodiments, configuring a test session may include configuring an emulated data center environment including accessing topology information describing an emulated network, an emulated device, an emulated host, a traffic generator, one or more physical or virtual connections, the emulated data center environment, or SUT 122.

In some embodiments, configuring a test session may include configuring traffic generators in various NEPs (e.g., NEPs 114-118) for generating test traffic based on predetermined or learned traffic patterns. For example, a first traffic generator implemented at NEP 114 and a second traffic generator implemented at NEP 116 may be configured to send background traffic via an emulated data center environment during a test session.

In some embodiments, configuring a test session may include configuring a network visibility analyzer for collecting, analyzing, or reporting emulated data center environment information, e.g., emulated switch status information or telemetry information.

In some embodiments, an emulated data center environment may include a Clos network environment, a multi-stage network environment, or a multi-tier network environment.

In some embodiments, TC 204, testing applications 214, SARA 206, and/or other test system entities may communicate via a test system API or a related server. In such embodiments, the test system API or the related server may convert or translate higher-level instructions (e.g., a gRPC API request for performance information) or data models into lower-level instructions (e.g., an ASIC register query) or data models for the switch.

It will be appreciated that process 600 is for illustrative purposes and that different and/or additional actions may be used. It will also be appreciated that various actions described herein may occur in a different order or sequence.

It should be noted that CTC 102, CM 108, NEPRA 110, test system 100, NEPs 114-118, and/or functionality described herein may constitute one or more special purpose computing devices. Further, CTC 102, CM 108, NEPRA 110, test system 100, NEPs 114-118, and/or functionality described herein can improve the technological field of testing networks and related nodes by providing mechanisms for data center environment emulation, e.g., configuring and controlling emulated switches using resources in multiple NEPs.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for testing a system using an emulated data center environment, the method comprising:

at a test controller of a network test system implemented using at least one processor:
receiving test configuration information for configuring a testing scenario comprising an emulated data center environment implemented using multiple network emulation platforms that are interconnected, wherein the test configuration information includes switching fabric topology information for defining the emulated data center environment;
configuring, using the test configuration information, the emulated data center environment including sending a set of configuration instructions to each of the network emulation platforms, wherein each of the sets of configuration instructions include resource allocation instructions for allocating ASIC switch resources of a respective network emulation platform to one or more emulated switches; and
configuring, using the test configuration information, a test session for testing a system under test (SUT) using the emulated data center environment and a network visibility infrastructure for obtaining performance information associated with the test session.

2. The method of claim 1, the method comprising:
initiating the test session, wherein initiating the test session includes generating and sending, using at least one traffic generator, test traffic via the emulated data center environment; and
during or after the test session:
receiving, from a requester, a performance query for accessing performance information about the emulated data center environment, wherein the emulated data center environment is implemented using the network emulation platforms, wherein the emulated data center environment includes a first emulated switch for communications involving a first set of physical ports connecting a first portion of the SUT and the network test system and a second emulated switch for communications involving a second set of physical ports connecting a second portion of the SUT and the network test system;
translating, using physical to logical resource mapping information, the performance query into at least two corresponding information requests, wherein one of the corresponding information requests refers to physical resources of a first network emulation platform associated with the emulated data center environment and another of the corresponding information requests refers to physical resources of a second network emulation platform associated with the emulated data center environment;

sending the at least two corresponding information requests to the network emulation platforms or a related controller;

receiving responses containing switch performance information associated with the at least two corresponding information requests;

translating, using the physical to logical resource mapping information, the switch performance information to the performance information about the emulated data center environment; and providing the performance information about the emulated data center environment to the requester.

3. The method of claim 2 wherein the at least one traffic generator includes a first traffic generator implemented at the first network emulation platform and a second traffic generator implemented at the second network emulation platform.

4. The method of claim 2 wherein the test controller, the network emulation platforms, or other test system entities communicate via a test system application programming interface (API) or a related server.

5. The method of claim 4 wherein the test system API or the related server converts or translates higher-level instructions or data models into lower level instructions or data models for the network emulation platforms or the switches.

6. The method of claim 1 wherein the SUT includes a network node, a server, a network interface card, an application server, or a group of servers.

7. The method of claim 1 wherein the emulated data center environment includes a Clos network environment, a multi-stage network environment, or a multi-tier network environment.

8. The method of claim 1 wherein each of the sets of configuration instructions include instructions for configuring network visibility infrastructure components of a respective network emulation platform.

9. The method of claim 1 wherein configuring the test session includes configuring at least one traffic generator for generating test traffic based on predetermined or learned traffic patterns;

wherein the network visibility infrastructure includes a network visibility analyzer for collecting, analyzing, or reporting emulated data center environment information;

wherein the topology information defining the emulated data center environment includes information about the emulated switches, emulated hosts, physical or virtual connections associated with the emulated data center environment, or physical or virtual connections associated with the SUT; or wherein receiving the test configuration information for configuring the testing scenario includes providing a user interface for defining the emulated data center environment involving the emulated switches.

10. A system for network testing using an emulated data center environment, the system comprising:

at least one processor;

a test controller of a network test system implemented using the at least one processor, wherein the test controller is configured for:

receiving test configuration information for configuring a testing scenario comprising an emulated data center environment implemented using multiple network emulation platforms that are interconnected, wherein the test configuration information includes switching fabric topology information for defining the emulated data center environment;

configuring, using the test configuration information, the emulated data center environment including sending a set of configuration instructions to each of the network emulation platforms, wherein each set of configuration instructions include resource allocation instructions for allocating ASIC switch resources of a respective network emulation platform to one or more emulated switches; and configuring, using the test configuration information, a test session for testing a system under test (SUT) using the emulated data center environment and a network visibility infrastructure for obtaining performance information associated with the test session.

11. The system of claim 10, wherein the network test system is further configured for:

initiating the test session, wherein initiating the test session includes generating and sending, using at least one traffic generator, test traffic via the emulated data center environment; and during or after the test session:

receiving, from a requester, a performance query for accessing performance information about the emulated data center environment, wherein the emulated data center environment is implemented using the network emulation platforms, wherein the emulated data center environment includes a first emulated switch for communications involving a first set of physical ports connecting a first portion of the SUT and the network test system and a second emulated switch for communications involving a second set of physical ports connecting a second portion of the SUT and the network test system;

translating, using physical to logical resource mapping information, the performance query into at least two corresponding information requests, wherein one of the corresponding information requests refers to physical resources of a first network emulation platform associated with the emulated data center environment and another of the corresponding information requests refers to physical resources of a second network emulation platform associated with the emulated data center environment sending the at least two corresponding information requests to the network emulation platforms or a related controller;

receiving responses containing switch performance information associated with the at least two corresponding information requests;

translating, using the physical to logical resource mapping information, the switch performance information to the performance information about the emulated data center environment; and providing the performance information about the emulated data center environment to the requester.

12. The system of claim 11 wherein the at least one traffic generator includes a first traffic generator implemented at the first network emulation platform and a second traffic generator implemented at the second network emulation platform.

13. The system of claim 11 wherein the test controller, the network emulation platforms, or other test system entities communicate via a test system application programming interface (API) or a related server.

14. The system of claim 13 wherein the test system API or the related server converts or translates higher-level instructions or data models into lower-level instructions or data models for the network emulation platforms or the switches.

15. The system of claim 10 wherein the SUT includes a network node, a server, a network interface card, an application server, or a group of servers.

16. The system of claim 10 wherein the emulated data center environment includes a Clos network environment, a multi-stage network environment, or a multi-tier network environment.

17. The system of claim 10 wherein each of the sets of configuration instructions include instructions for configuring network visibility infrastructure components of a respective network emulation platform.

18. The system of claim 10 wherein configuring the test session includes configuring at least one traffic generator for generating test traffic based on predetermined or learned traffic patterns;
 wherein the network visibility infrastructure includes a network visibility analyzer for collecting, analyzing, or reporting emulated data center environment information;
 wherein the topology information defining the emulated data center environment includes information about the emulated switches, emulated hosts, physical or virtual connections associated with the emulated data center environment, or physical or virtual connections associated with the SUT; or
 wherein receiving the test configuration information for configuring the testing scenario includes providing a user interface for defining the emulated data center environment involving the emulated switches.

19. A non-transitory computer readable medium having stored thereon executable instructions embodied in the computer readable medium that when executed by at least one processor of a network test system cause the network test system to perform steps comprising:
 at a test controller of a network test system implemented using at least one processor:
  receiving test configuration information for configuring a testing scenario comprising an emulated data center environment implemented using multiple network emulation platforms that are interconnected, wherein the test configuration information includes switching fabric topology information for defining the emulated data center environment;
  configuring, using the test configuration information, the emulated data center environment including sending a set of configuration instructions to each of the network emulation platforms, wherein each set of configuration instructions include resource allocation instructions for allocating ASIC switch resources of a respective network emulation platform to one or more emulated switches; and
  configuring, using the test configuration information, a test session for testing a system under test (SUT) using the emulated data center environment and a network visibility infrastructure for obtaining performance information associated with the test session.

20. The non-transitory computer readable medium of claim 19, performing additional steps comprising:
 initiating the test session, wherein initiating the test session includes generating and sending, using at least one traffic generator, test traffic via the emulated data center environment; and
during or after the test session:
 receiving, from a requester, a performance query for accessing performance information about the emulated data center environment, wherein the emulated data center environment is implemented using the network emulation platforms, wherein the emulated data center environment includes a first emulated switch for communications involving a first set of physical ports connecting a first portion of the SUT and the network test system and a second emulated switch for communications involving a second set of physical ports connecting a second portion of the SUT and the network test system;
 translating, using physical to logical resource mapping information, the performance query into at least two corresponding information requests, wherein one of the corresponding information requests refers to physical resources of a first network emulation platform associated with the emulated data center environment and another of the corresponding information requests refers to physical resources of a second network emulation platform associated with the emulated data center environment;
 sending the at least two corresponding information requests to the network emulation platforms or a related controller;
 receiving responses containing switch performance information associated with the at least two corresponding information requests;
 translating, using the physical to logical resource mapping information, the switch performance information to the performance information about the emulated data center environment; and
 providing the performance information about the emulated data center environment to the requester.

* * * * *